United States Patent
He et al.

(10) Patent No.: US 11,013,021 B2
(45) Date of Patent: May 18, 2021

(54) SYSTEM INFORMATION OBTAINING METHOD, USER EQUIPMENT, AND NETWORK SIDE DEVICE

(71) Applicant: CHINA ACADEMY OF TELECOMMUNICATIONS TECHNOLOGY, Beijing (CN)

(72) Inventors: Yuan He, Beijing (CN); Fangli Xu, Beijing (CN); Pierre Bertrand, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 72 days.

(21) Appl. No.: 16/345,820

(22) PCT Filed: Oct. 25, 2017

(86) PCT No.: PCT/CN2017/107677
§ 371 (c)(1),
(2) Date: Apr. 29, 2019

(87) PCT Pub. No.: WO2018/082494
PCT Pub. Date: May 11, 2018

(65) Prior Publication Data
US 2019/0268922 A1 Aug. 29, 2019

(30) Foreign Application Priority Data
Nov. 4, 2016 (CN) .......................... 201610965707.5

(51) Int. Cl.
*H04W 72/12* (2009.01)
*H04W 48/12* (2009.01)

(52) U.S. Cl.
CPC ....... *H04W 72/1263* (2013.01); *H04W 48/12* (2013.01); *H04W 72/1289* (2013.01)

(58) Field of Classification Search
CPC .......................... H04W 72/1263; H04W 48/12
See application file for complete search history.

(56) References Cited

U.S. PATENT DOCUMENTS

| 2010/0027466 | A1 | 2/2010 | Mustapha | |
| 2016/0234735 | A1* | 8/2016 | Kubota | H04W 48/14 |
| 2016/0234759 | A1* | 8/2016 | Kubota | H04W 48/12 |
| 2017/0230977 | A1 | 8/2017 | Shen et al. | |

(Continued)

FOREIGN PATENT DOCUMENTS

| CN | 101114869 A | 1/2008 |
| CN | 103906148 A | 7/2014 |

(Continued)

OTHER PUBLICATIONS

International Search Report for PCT/CN2017/107677 dated Jan. 24, 2018 and its English translation provided by WIPO.

(Continued)

*Primary Examiner* — Donald L Mills
(74) *Attorney, Agent, or Firm* — Ladas & Parry, LLP

(57) ABSTRACT

A system information obtaining method, a UE and a network side device are provided. The method includes: receive first scheduling information of on-demand SI sent by a network side device; obtain the on-demand SI sent by the network side device based on the first scheduling information.

16 Claims, 11 Drawing Sheets

(56) References Cited

U.S. PATENT DOCUMENTS

| | | | |
|---|---|---|---|
| 2018/0035361 A1* | 2/2018 | Ishii | H04W 48/10 |
| 2018/0049107 A1* | 2/2018 | Johansson | H04W 48/10 |
| 2018/0103369 A1* | 4/2018 | Chou | H04L 27/2613 |
| 2019/0053131 A1* | 2/2019 | Suzuki | H04W 24/08 |
| 2019/0124568 A1* | 4/2019 | Kubota | H04W 36/0083 |
| 2019/0174398 A1* | 6/2019 | Geng | H04W 72/0446 |
| 2019/0174554 A1* | 6/2019 | Deenoo | H04W 76/27 |
| 2019/0223094 A1* | 7/2019 | Ingale | H04W 68/005 |
| 2019/0223154 A1* | 7/2019 | Jia | H04W 76/27 |
| 2019/0281535 A1* | 9/2019 | Wei | H04W 48/14 |
| 2019/0297563 A1* | 9/2019 | Sharma | H04W 48/12 |
| 2019/0297598 A1* | 9/2019 | Li | H04W 72/048 |
| 2020/0084708 A1* | 3/2020 | Ingale | H04W 48/16 |
| 2020/0169927 A1* | 5/2020 | Kubota | H04L 12/18 |

FOREIGN PATENT DOCUMENTS

| | | |
|---|---|---|
| CN | 104349420 A | 2/2015 |
| CN | 105472528 A | 4/2016 |
| JP | 2010506434 A | 2/2010 |
| WO | 2008044664 A1 | 4/2008 |
| WO | 2016095820 A1 | 6/2016 |

OTHER PUBLICATIONS

Written Opinion of the International Searching Authority for PCT/CN2017/107677 dated Jan. 24, 2018 and its English translation provided by Google Translate.

Notice of Reasons for Refusal from JP app. No. 2019-521804, dated Mar. 3, 2020, with English translation from Global Dossier.

"System Information Signalling Design in NR", R2-164693, 3GPP TSG-RAN WG2 meeting #95, Gothenburg, Sweden, Aug. 22-26, 2016.

"Consideration on the Other SI delivery in NR", R2-166343, 3GPP TSG-RAN WG2 Meeting #95bis, Kaohsiung, Oct. 10-14, 2016.

"System information for standalone NR deployment", R2-166885, 3GPP TSG-RAN WG2 Meeting #95bis, Kaohsiung, Oct. 10-14, 2016.

Extended European Search Report from EP app. No. 17867565.8, dated Sep. 17, 2019.

International Preliminary Report on Patentability from PCT/CN2017/107677, dated May 7, 2019, with English translation from WIPO.

Written Opinion of the International Searching Authority from PCT/CN2018/107677, dated Jan. 24, 2018, with English translation from WIPO.

"Further Discussions of 'Minimum SI'", R2-166202, 3GPP TSG RAN2 Meeting #95bis, Kaohsiung, Oct. 10-15, 2016.

"Delivery of 'Other Si' in NR", R2-166203, 3GPP TSG RAN2 Meeting #95bis, Kaohsiung, Oct. 10-15, 2016.

Communication pursuant to Article 94(3) EPC from EP app. No. 17867565.8, dated Sep. 18, 2020.

Notice of Reasons for Refusal from JP app. No. 2019-521804, dated Jul. 14, 2020, with English translation provided by Global Dossier.

"On-demand System Information Delivery Mechanism", R2-164811, 3GPP TSG RAN WG2 Meeting #95, Gothenburg, Sweden, Aug. 22-26, 2016.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36,331 V:14.0,0 (Sep. 2016).

* cited by examiner

SYSTEM INFORMATION OBTAINING METHOD, USER EQUIPMENT, AND NETWORK SIDE DEVICE

CROSS-REFERENCE TO RELATED APPLICATIONS

The present application is the U.S. national phase of PCT Application No. PCT/CN2017/107677 filed on Oct. 25, 2017, which claims a priority to the Chinese patent application No. 201610965707.5 filed on Nov. 4, 2016, the disclosures of which are incorporated herein by reference in their entireties.

TECHNICAL FIELD

The present disclosure relates to the field of communication technology, in particular to a SI obtaining method, a user equipment (UE) and a network side device.

BACKGROUND

The system information (SI) of a wireless communication system is mainly divided into a master information block (MIB) and a plurality of SI blocks (SIBs). The SI blocks may include SIB1-SIB20. In practical applications, SI is required to be broadcasted in many scenarios. For example, when a UE newly accesses a cell or a broadcast message changes, SI is broadcasted. At present, all SI are broadcasted each time, that is, SI including MIB, SIB1, and SI, where SI includes SIB2-SIB20. Of course, the SI may include more information. Since the SI in the wireless communication system is periodically broadcasted, the content of the SI will be more and more as the service of the wireless communication system is diversified and the terminal type is continuously evolved. The overhead of the SI will be larger and larger. Therefore, there is a problem of excessive overhead of SI in wireless communication systems.

SUMMARY

An object of the present disclosure is to provide a SI obtaining method, a UE and a network side device, so as to solve the problem of excessive overhead of SI in wireless communication systems.

In order to solve the above problem, the present disclosure provides in some embodiments a SI obtaining method including: receiving, by a user equipment (UE), first scheduling information of on-demand SI sent by a network side device; obtaining, by the UE, the on-demand SI sent by the network side device based on the first scheduling information.

In some embodiments, the first scheduling information comprises one or more parameter configurations: a SI mapping table, a SI period, a SI time window, a starting point, and a transmission number of the SI, wherein the SI mapping table is used to indicate the on-demand SI corresponding to the first scheduling information.

In some embodiments, the receiving, by the UE, the first scheduling information of the on-demand SI from the network side device includes: receiving, by the UE, SI periodically broadcasted by the network side device, and the SI periodically broadcasted by the network side device comprising the first scheduling information of the on-demand SI.

In some embodiments, the obtaining, by the UE, the on-demand SI sent by the network side device based on the first scheduling information includes: if the first scheduling information includes a predefined parameter configuration, using, by the UE, the parameter configuration included in the first scheduling information to receive the on-demand SI sent by the network side device; or if the first scheduling information includes a predefined parameter configuration and the on-demand SI corresponding to the first scheduling information includes the on-demand SI required by the UE, using, by the UE, the parameter configuration included in the first scheduling information to receive the on-demand SI sent by the network side device.

In some embodiments, the obtaining, by the UE, the on-demand SI sent by the network side device based on the first scheduling information includes: determining, by the UE, whether an on-demand SI request message is necessary to be sent to the network side device based on the first scheduling information; if yes, sending, by the UE, the on-demand SI request message to the network side device, the on-demand SI request message being used to request the on-demand SI required by the UE; and receiving, by the UE, an on-demand SI response message sent by the network side device.

In some embodiments, the determining, by the UE, whether an on-demand SI request message is necessary to be sent to the network side device based on the first scheduling information, includes: determining, by the UE, whether the on-demand SI corresponding to the first scheduling information includes the on-demand SI required by the UE, and if not, determining that on-demand SI request message is necessary to be sent to the network side device; or determining, by the UE, whether parameter configuration included in the first scheduling information includes only a first part of parameter configuration, and if yes, determining that the on-demand SI request message is necessary to be sent to the network side device.

In some embodiments, the obtaining, by the UE, the on-demand SI sent by the network side device based on the first scheduling information further includes: receiving, by the UE, a SI modification indication sent by the network side device; receiving, by the UE, a second scheduling information of the on-demand SI sent by the network side device based on the SI modification indication, wherein the on-demand SI corresponding to the second scheduling information includes the on-demand SI required by the UE, and the second scheduling information includes predefined parameter configuration; the receiving, by the UE, the on-demand SI response message sent by the network side device comprises: receiving, by the UE, the on-demand SI response message sent by the network side device by using parameter configuration included in the second scheduling information.

In some embodiments, the obtaining, by the UE, the on-demand SI sent by the network side device based on the first scheduling information further comprises: receiving, by the UE, third scheduling information of the on-demand SI sent by the network side device, wherein the on-demand SI corresponding to the third scheduling information includes the on-demand SI required by the UE, and the third scheduling information includes a predefined parameter configuration; the receiving, by the UE, the on-demand SI response message sent by the network side device comprises: receiving, by the UE, the on-demand SI response message sent by the network side device by using the parameter configuration included in the third scheduling information.

In some embodiments, the obtaining, by the UE, the on-demand SI sent by the network side device based on the first scheduling information further comprises: receiving, by the UE, fourth scheduling information of the on-demand SI sent by the network side device, wherein the on-demand SI corresponding to the fourth scheduling information includes on-demand SI required by the UE and the fourth scheduling information includes a second part of parameter configuration; the receiving, by the UE, the on-demand SI response message sent by the network side device, comprises: if the parameter configuration included in the first scheduling information includes the first part of parameter configuration, receiving, by the UE, the on-demand SI response message sent by the network side device by using the first part of parameter configuration and the second part of parameter configuration.

In some embodiments, the obtaining, by the UE, the on-demand SI sent by the network side device based on the first scheduling information further comprises: receiving, by the UE, a transmission indication sent by the network side device, the transmission indication being used to indicate that the SI response message is sent based on the first scheduling information; the receiving, by the UE, the on-demand SI response message sent by the network side device, comprises: receiving, by the UE, the on-demand SI response message sent by the network side device by using parameter configuration included in the first scheduling information.

In some embodiments, the method further includes: if the UE determines that the on-demand SI modified by the network side device does not include all or part of the on-demand SI required by the UE based on the SI modification indication, resending, by the UE, the on-demand SI request message.

In some embodiments, the method further includes: if the SI response message does not include all or part of the on-demand SI required by the UE, resending, by the UE, the on-demand SI request message; or if the UE does not receive the on-demand SI response message within a predefined or pre-configured time period, resending, by the UE, the on-demand SI request message.

In some embodiments, the method further includes: receiving, by the UE, indication information sent by the network side device, wherein the indication information is used to indicate whether the network side device provides the on-demand SI; sending, by the UE, an on-demand SI request message to the network side device based on the indication information, wherein the on-demand SI request message is used to request the on-demand SI required by the user equipment; the receiving, by the UE, the first scheduling information of the on-demand SI sent by the network side device, comprises: receiving, by the UE, the first scheduling information of the on-demand SI required by UE and sent by the network side device; the obtaining, by the UE, the on-demand SI sent by the network side device based on the first scheduling information, comprises: receiving, by the UE, an on-demand SI response message sent by the network side device by using parameter configuration included in the first scheduling information.

In some embodiments, the indication information is used to indicate whether the network side device provides the on-demand SI, or the indication information includes a SI list of the on-demand SI provided by the network side device; the sending, by the UE, the on-demand SI request message to the network side device based on the indication information comprises: if the indication information indicates that the network side device provides the on-demand SI, sending, by the UE, the on-demand SI request message to the network side device; or if the on-demand SI indicated by the SI list includes the on-demand SI required by the UE, sending, by the UE, the on-demand SI request message to the network side device.

In some embodiments, the sending, by the UE, the on-demand SI request message to the network side device, comprises: sending, by the UE, the on-demand SI request message to the network side device by using a message three (Msg3) of a random access procedure; or sending, by the UE, the on-demand SI request message to the network side device by using an radio resource control (RRC) message; or sending, by the UE, the on-demand SI request message to the network side device by using a medium access control (MAC) control element (CE).

In some embodiments, the method further includes: obtaining, by the UE, mapping relationship information between an uplink signal and the on-demand SI; the sending, by the UE, the on-demand SI request message to the network side device, includes: sending, by the UE, the uplink signal to the network side device, wherein there is a mapping relationship between the uplink signal and the on-demand SI required by the UE.

In another aspect, a system information (SI) obtaining method, includes: sending, by a network side device, first scheduling information of an on-demand SI to a user equipment (UE); and sending, by the network side device, the on-demand SI to the UE.

In some embodiments, the first scheduling information comprises one or more parameter configurations: a SI mapping table, a SI period, a SI time window, a starting point, and a transmission number of SI, wherein the SI mapping table is used to indicate the on-demand SI corresponding to the first scheduling information.

In some embodiments, the sending, by the network side device, the first scheduling information of the on-demand SI to the UE, comprises: broadcasting periodically, by the network side device, the SI, wherein the periodically broadcasted SI includes the first scheduling information of the on-demand SI.

In some embodiments, the method further includes: receiving, by the network side device, an on-demand SI request message sent by the UE, wherein the on-demand SI request message is used to request the on-demand SI required by the UE; the sending, by the network side device, the on-demand SI to the UE, comprises: sending, by the network side device, an on-demand SI response message to the UE.

In some embodiments, the method further includes: sending, by the network side device, a modification indication of the SI to the UE; sending, by the network side device, to the UE, second scheduling information of the on-demand SI, wherein the on-demand SI corresponding to the second scheduling information includes the on-demand SI required by the UE, and the second scheduling information includes a predefined parameter configuration; the sending, by the network side device, the on-demand SI response message to the UE, comprises: sending, by the network side device, an on-demand SI response message to the UE based on the parameter configuration included in the second scheduling information.

In some embodiments, the method further includes: sending, by the network side device, third scheduling information of the on-demand SI to the UE, wherein the on-demand SI corresponding to the third scheduling information includes the on-demand SI required by the UE, and the third scheduling information includes predefined parameter configuration; the sending, by the network side device, the on-demand SI response message to the UE, includes: sending, by the network side device, the on-demand SI response message to the UE based on parameter configuration included in the third scheduling information.

In some embodiments, the method further includes: if parameter configuration included in the first scheduling information includes only a first part of parameter configuration, sending, by the network side device, fourth scheduling information of the on-demand SI to the UE, wherein the on-demand SI corresponding to the fourth scheduling information includes the on-demand SI required by the UE, and the fourth scheduling information includes a second part of parameter configuration; the sending, by the network side device, the on-demand SI response message to the UE, comprises: sending, by the network side device, the on-demand SI response message to the UE based the first part of parameter configuration and the second part of parameter configuration.

In some embodiments, the method further includes: sending, by the network side device, a transmission indication to the UE, wherein the transmission indication is used to indicate that the SI response message is sent based on the first scheduling information; the sending, by the network side device, the on-demand SI response message to the UE, comprises: sending, by the network side device, the on-demand SI response message to the UE based on parameter configuration included in the first scheduling information.

In some embodiments, the method further includes: sending, by the network side device, indication information to the UE, wherein the indication information is used to indicate that the network side device provides the on-demand SI; receiving, by the network side device, an on-demand SI request message sent by the UE based on the indication information, wherein the on-demand SI request message is used to request on-demand SI required by the UE; the sending, by the network side device, the first scheduling information of the required SI to the UE, comprises: sending, by the network side device, the first scheduling information of the on-demand SI required by the UE to the UE; the sending, by the network side device, the on-demand SI to the UE, comprises: sending, by the network side device, an on-demand SI response message to the UE based on parameter configuration included in the first scheduling information.

In some embodiments, the indication information is used to indicate whether the network side device provides the on-demand SI; or the indication information includes a SI list of the on-demand SI provided by the network side device.

In some embodiments, the receiving, by the network side device, the on-demand SI request message sent by the UE, includes: receiving, by the network side device, the on-demand SI request message sent by the UE through Msg3 of a random access procedure; or receiving, by the network side device, the on-demand SI request message sent by the UE by using an RRC message; or receiving, by the network side device, the on-demand SI request message sent by the UE by using a MAC CE.

In some embodiments, the method further includes: sending, by the network side device, mapping relationship information between an uplink signal and the on-demand SI to the UE; the receiving, by the network side device, the on-demand SI request message sent by the UE, comprises: receiving, by the network side device, the uplink signal sent by the UE, wherein there is a mapping relationship between the uplink signal and on-demand SI required by the UE.

In yet another aspect, a user equipment (UE), includes: a first receiving module, configured to receive first scheduling information of on-demand SI sent by a network side device; a first obtaining module, configured to acquire the on-demand SI sent by the network side device based on the first scheduling information.

In some embodiments, the first scheduling information comprises one or more parameter configurations: a SI mapping table, a SI period, a SI time window, a starting point, and a transmission number of the SI, wherein the SI mapping table is used to indicate the on-demand SI corresponding to the first scheduling information.

In some embodiments, the first receiving module is configured to receive SI periodically broadcasted by the network side device, and the SI periodically broadcasted by the network side device includes the first scheduling information of the on-demand SI.

In some embodiments, the first obtaining module is configured to: if the first scheduling information includes a predefined parameter configuration, receive the on-demand SI sent by the network side device by using the parameter configuration included in the first scheduling information; or if the first scheduling information includes a predefined parameter configuration and the on-demand SI corresponding to the first scheduling information includes an on-demand SI required by the UE, receive the on-demand SI sent by the network side device by using the parameter configuration included in the first scheduling information.

In some embodiments, the first obtaining module comprises: a determining unit, configured to determine whether an on-demand SI request message needs to be sent to the network side device based on the first scheduling information; a sending unit, configured to: if it is determined that the on-demand SI request message needs to be sent to the network side device, send the on-demand SI request message to the network side device, wherein the on-demand SI request message is used request on-demand SI required by the UE; and a first receiving unit, configured to receive an on-demand SI response message sent by the network side device.

In some embodiments, the determining unit is configured to: determine whether the on-demand SI corresponding to the first scheduling information includes the on-demand SI required by the UE, and if not, determine that on-demand SI request message is necessary to be sent to the network side device; or determine whether parameter configuration included in the first scheduling information includes only a first part of parameter configuration, and if yes, determine that the on-demand SI request message is necessary to be sent to the network side device.

In some embodiments, the first obtaining module further comprises: a second receiving unit, configured to receive a SI modification indication sent by the network side device; a third receiving unit, configured to receiving a second scheduling information of the on-demand SI sent by the network side device based on the SI modification indication, wherein the on-demand SI corresponding to the second scheduling information includes the on-demand SI required by the UE, and the second scheduling information includes predefined parameter configuration; the first receiving unit is configured to receive an on-demand SI response message sent by the network side device by using parameter configuration included in the second scheduling information.

In some embodiments, the first obtaining module further includes: a fourth receiving unit, configured to receive third scheduling information of the on-demand SI sent by the network side device, wherein the on-demand SI corresponding to the third scheduling information includes the on-demand SI required by the UE, and the third scheduling information includes a predefined parameter configuration; the first receiving unit is configured to receive the on-demand SI response message sent by the network side device by using the parameter configuration included in the third scheduling information.

In some embodiments, the first obtaining module further comprises: a fifth receiving unit, configured to receive fourth scheduling information of the on-demand SI sent by the network side device, wherein the on-demand SI corresponding to the fourth scheduling information includes on-demand SI required by the UE and the fourth scheduling information includes a second part of parameter configuration; the first receiving unit is configured to: if the parameter configuration included in the first scheduling information includes the first part of parameter configuration, receive the on-demand SI response message sent by the network side device by using the first part of parameter configuration and the second part of parameter configuration.

In some embodiments, the first obtaining module further comprises: a sixth receiving unit, configured to receive a transmission indication sent by the network side device, the transmission indication being used to indicate that the SI response message is sent based on the first scheduling information; the first receiving unit is configured to receive the on-demand SI response message sent by the network side device by using parameter configuration included in the first scheduling information.

In some embodiments, the sending unit is further configured to: if the UE determines that the on-demand SI modified by the network side device does not include all or part of the on-demand SI required by the UE based on the SI modification indication, resend the on-demand SI request message.

In some embodiments, the sending unit is further configured to: if the SI response message does not include all or part of the on-demand SI required by the UE, resend the on-demand SI request message; or if the UE does not receive the on-demand SI response message within a predefined or pre-configured time period, resend the on-demand SI request message.

In some embodiments, the UE further includes: a second receiving module, configured to receive indication information sent by the network side device, wherein the indication information is used to indicate whether the network side device provides the on-demand SI; a sending module, configured to send an on-demand SI request message to the network side device based on the indication information, wherein the on-demand SI request message is used to request an on-demand SI required by the user equipment; the first receiving module is configured to receive the first scheduling information of the on-demand SI required by UE and sent by the network side device; the first obtaining module is configured to receive an on-demand SI response message sent by the network side device by using parameter configuration included in the first scheduling information.

In some embodiments, the indication information is used to indicate whether the network side device provides the on-demand SI, or the indication information includes a SI list of the on-demand SI provided by the network side device; the sending module is configured to: if the indication information indicates that the network side device provides the on-demand SI, send the on-demand SI request message to the network side device; or if the on-demand SI indicated by the SI list includes the on-demand SI required by the UE, send the on-demand SI request message to the network side device.

In some embodiments, the sending unit is configured to: send the on-demand SI request message to the network side device by using a message Msg3 of a random access procedure; or send the on-demand SI request message to the network side device by using an RRC message; or send the on-demand SI request message to the network side device by using a MAC control unit CE.

In some embodiments, the UE further includes: a second obtaining module, configured to obtain mapping relationship information between an uplink signal and the on-demand SI; the sending unit is configured to send the uplink signal to the network side device, wherein there is a mapping relationship between the uplink signal and the on-demand SI required by the UE.

In yet another aspect, a network side device includes: a first sending module, configured to send first scheduling information of an on-demand system information (SI) to a user equipment (UE); and a second sending module, configured to send the on-demand SI to the UE.

In some embodiments, the first scheduling information comprises one or more parameter configurations: a SI mapping table, a SI period, a SI time window, a starting point, and a transmission number of SI, wherein the SI mapping table is used to indicate the on-demand SI corresponding to the first scheduling information.

In some embodiments, the first sending module is configured to broadcast periodically the SI, wherein the periodically broadcasted SI includes the first scheduling information of the on-demand SI.

In some embodiments, the network side device further includes: a first receiving module, configured to receive an on-demand SI request message sent by the UE, wherein the on-demand SI request message is used to request an on-demand SI required by the UE; the second sending module is configured to send an on-demand SI response message to the UE.

In some embodiments, the network side device further includes: a third sending module, configured to send a modification indication of the SI to the UE; a fourth sending module, configured to send second scheduling information of the on-demand SI, wherein the on-demand SI corresponding to the second scheduling information includes the on-demand SI required by the UE, and the second scheduling information includes a predefined parameter configuration; the second sending module is configured to send an on-demand SI response message to the UE based on the parameter configuration included in the second scheduling information.

In some embodiments, the network side device further includes: a fifth sending module, configured to send third scheduling information of the on-demand SI to the UE, wherein the on-demand SI corresponding to the third scheduling information includes the on-demand SI required by the UE, and the third scheduling information includes predefined parameter configuration; the second sending module is configured to send the on-demand SI response message to the UE based on parameter configuration included in the third scheduling information.

In some embodiments, the network side device further includes: a sixth sending module, configured to, if parameter configuration included in the first scheduling information includes only a first part of parameter configuration, send fourth scheduling information of the on-demand SI to the UE, wherein the on-demand SI corresponding to the fourth scheduling information includes the on-demand SI required by the UE, and the fourth scheduling information includes a second part of parameter configuration; the second sending module is configured to send the on-demand SI response message to the UE based the first part of parameter configuration and the second part of parameter configuration.

In some embodiments, the network side device further includes: a seventh sending module, configured to send a transmission indication to the UE, wherein the transmission indication is used to indicate that the SI response message is sent based on the first scheduling information; the second sending module is configured to send the on-demand SI response message to the UE based on parameter configuration included in the first scheduling information.

In some embodiments, the network side device further includes: an eighth sending module, configured to send indication information to the UE, wherein the indication information is used to indicate that the network side device provides the on-demand SI; a second receiving module, configured to receive an on-demand SI request message sent by the UE based on the indication information, wherein the on-demand SI request message is used to request an on-demand SI required by the UE; the first sending module is configured to send the first scheduling information of the on-demand SI required by the UE to the UE; the second sending module is configured to send an on-demand SI response message to the UE based on parameter configuration included in the first scheduling information.

In some embodiments, the indication information is used to indicate whether the network side device provides the on-demand SI; or the indication information includes a SI list of the on-demand SI provided by the network side device.

In some embodiments, the first receiving module is configured to: receive the on-demand SI request message sent by the UE through Msg3 of a random access procedure; or receive the on-demand SI request message sent by the UE by using an RRC message; or receive the on-demand SI request message sent by the UE by using a MAC CE.

In some embodiments, the network side device further includes: a ninth sending module, configured to send mapping relationship information between an uplink signal and the on-demand SI to the UE; the first receiving module is configured to receive the uplink signal sent by the UE, wherein there is a mapping relationship between the uplink signal and the on-demand SI required by the UE.

In yet another aspect, a user equipment, including a transceiver, a processor and a memory for storing programs and data used and executed by the processor, wherein the transceiver is configured to receive first scheduling information of on-demand SI sent by a network side device, the processor is configured to obtain, by the transceiver, the on-demand SI sent by the network side device based on the first scheduling information.

In yet another aspect, a network side device, including a transceiver, a processor and a memory for storing programs and data used and executed by the processor, wherein the processor is configured to send, by the transceiver, first scheduling information of an on-demand SI to a user equipment (UE); and send the on-demand SI to the UE.

In yet another aspect, a non-transient computer readable storage medium, storing computer readable instructions being executed by a processor so that the processor is configured to: receive first scheduling information of on-demand SI sent by a network side device; and obtain the on-demand SI sent by the network side device based on the first scheduling information.

In yet another aspect, a non-transient computer readable storage medium, storing computer readable instructions being executed by a processor so that the processor is configured to: send first scheduling information of an on-demand SI to a user equipment (UE); and sending the on-demand SI to the UE.

The beneficial effects of the above technical solution of the present disclosure are as follows.

In the foregoing solution, a UE receive first scheduling information of on-demand SI sent by a network side device; and obtain the on-demand SI sent by the network side device based on the first scheduling information receives SI sent by a network side device. As compared with periodically broadcasting all SI in the related art, in the present disclosure, the SI may be sent as required and overhead of the SI is reduced.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

Figure 1:
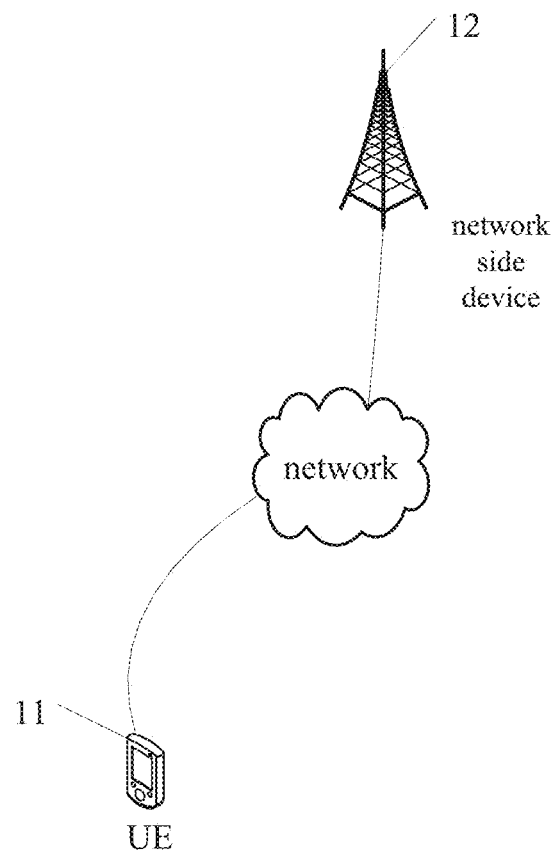
FIG. 1 is a schematic view showing a network structure according to some embodiments of the present disclosure.

FIG. 1 is a schematic diagram of a network according to some embodiments of the present disclosure. As shown in FIG. 1, one or more UE (UE) 11 and a network side device 12 are included. In FIG. 1, there is only one UE. The UE 11 is also referred as a terminal; it may be a mobile phone, a tablet personal computer, a laptop computer, a personal digital assistant (PDA), a mobile internet device (MID), or a wearable device. It should be noted that the specific type of the UE 11 is not limited in the embodiments of the present disclosure. The UE 11 can establish communication with the network side device 12. The network in FIG. 1 can indicate that the UE 11 and the network side device 12 establish wireless communication, and the network side device 12 can be base station, the base station may be a Macro base station, such as LET eNB, 5G NR NB (gNB), or may be a micro base station such as low power node (LPN), pico, femto, or may be an access point (AP).

Figure 2:
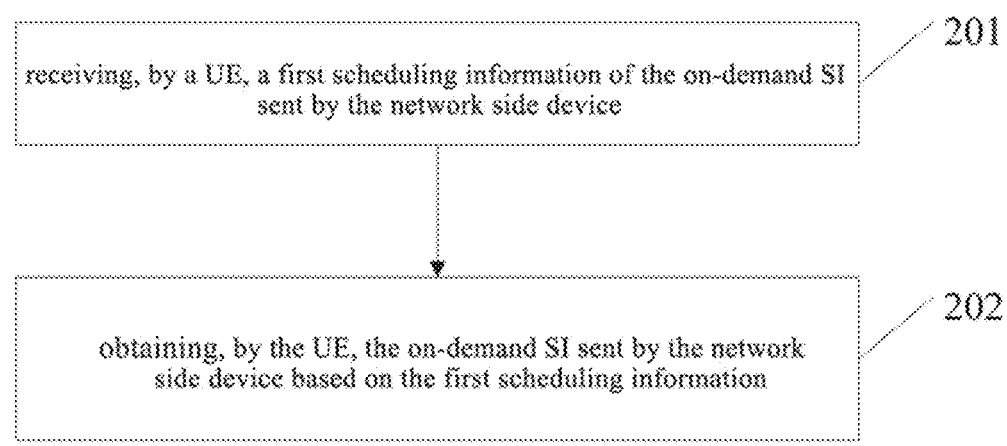
FIG. 2 is a flow chart showing a SI obtaining method according to some embodiments of the present disclosure.

Some embodiments of the present disclosure provide a SI obtaining method, as shown in FIG. 2, including the following steps.

201. receiving, by a UE, first scheduling information of on-demand SI sent by a network side device;

202. obtaining, by the UE, the on-demand SI sent by the network side device based on the first scheduling information.

In some embodiments of the present disclosure, the on-demand SI may be a part of SI included in the network side device, or the on-demand SI of the network side device may be SI other than periodic broadcast SI. The periodic broadcast SI may be the SI which is included in the network side device and which needs to be broadcast periodically, e.g., the SI other than the on-demand SI or the SI for enabling the UE to reside in the cell and access to the resident cell, e.g., all or parts of the contents in the MIB, the SIB1 and the SIB2, or necessary SI for enabling the UE to reside in the cell and access to the resident cell. In addition, the on-demand SI may also be understood as the SI to be transmitted in an on-demand manner.

The first scheduling information may be related information for the UE to detect or receive the on-demand SI corresponding to the first scheduling information, that is, the UE can detect or receive the on-demand SI corresponding to the first scheduling information by using the first scheduling information. In addition, in some embodiments of the present disclosure, there may be one scheduling information for each on-demand SI, that is, one scheduling information corresponds to one on-demand SI, or there is one scheduling information for a group of on-demand SI, that is, one scheduling information corresponds to a group of on-demand SI.

The obtaining, by the UE, the on-demand SI sent by the network side device based on the first scheduling information may be that UE implements a process of obtaining the on-demand SI sent by the network side device based on the first scheduling information. The on-demand SI obtained in the process may be on-demand SI that does not correspond to the first scheduling information, or on-demand SI corresponding to the first scheduling information. The obtaining, by the UE, the on-demand SI sent by the network side device based on the first scheduling information may be that the UE acquires the on-demand SI sent by the network side device by using the first scheduling information, where the acquired on-demand SI may be on-demand SI corresponding to the first scheduling information.

It should be noted that, in some embodiments of the present disclosure, the SI is not limited to MIB, and SIB1-SIB20. For example, the SI may also be SIBn, where n is an integer greater than 20, or the SI may be adapted to the development and extension of wireless communication systems in the future.

SIB1 may include related parameters of broadcasting cell access and cell selection, and scheduling information of the SI message, and may include one or more SIBs 2-13. SIB2 may include a wireless parameter configuration shared by all UEs in the cell, and other basic wireless parameter configuration. SIB3 may include cell reselection information, mainly relate to serving cell reselection parameters and co-frequency cell reselection parameters. SIB4 may include a list of co-frequency neighboring cells and a reselection parameter of each neighboring cell, and a list of co-frequency white/blacklisted cells. SIB5 may include a list of inter-frequency neighboring frequency points and reselection parameters of each frequency point, a list of inter-frequency neighboring cells, and reselection parameters of each neighboring cell, and a list of inter-frequency blacklisted cells. SIB6 may include a list of UMTS Terrestrial Radio Access-Frequency Division Duplexing (UTRAFDD) adjacent frequency points and a reselection parameter for each frequency point, a list of UTRA TDD adjacent frequency points and a reselection parameter for each frequency point. SIB7 may include a list of GSM and EDGE radio access network (GERAN) GSM EDGE Radio Access Network (GERAN) adjacent frequency points and reselection parameters for each frequency point. SIB8 may include pre-registration information of CDMA2000, a list of CDMA2000 adjacent frequency bands, and reselection parameters of each frequency band, and a list of adjacent cells of CDMA2000 adjacent frequency bands. SIB9 may include the name of a Home eNodeB. SIB10 may include a primary notification for an Earthquake and Tsunami Warning System (ETWS). SIB11 may include an ETWS secondary notification. SIB 12 may include a Commercial Mobile Alert Service (CMAS). SIB 13 may include information for obtaining Multimedia Broadcast Multicast Service (MBMS) control information related to one or more multicast broadcast single frequency networks (MBSFN) areas. SIB14-SIB20 have their own characteristics, which are not described one by one.

In addition, it should be noted that the on-demand SI acquired in step 202 may include all or part of the on-demand SI required by the UE, or the on-demand SI acquired in step 202 does not include the SI required by the UE. For example, the on-demand SI required by the UE is SIB3 and SIB4, and the on-demand SI sent by the network side device may be SIB3 and SIB4, or SIB3 and SIB5, or SIB6, SIB7, SIB8, and SIB9. When the on-demand SI received by the UE does not include the SI required by the UE or only part of the SI required by the UE, the UE may perform the next obtaining process of the on-demand SI.

Based on the above steps, the UE can acquire the on-demand SI sent by the network side device based on the first scheduling information. Since not all SI are broadcasted every time, so that the transmission resource can be saved.

Optionally, the first scheduling information includes one or more parameter configurations: a SI mapping table, a SI period, a SI window, a starting point, and a transmission number of SI. The SI mapping table is used to indicate the on-demand SI corresponding to the first scheduling information.

In this embodiment, the UE can know on-demand SI corresponding to the first scheduling information according to the SI mapping table, or the SI mapping table can indicate that the first scheduling information is scheduling information for certain SI. Optionally, the SI mapping table may include an on-demand SI list (SIB mapping list) corresponding to the first scheduling information, and one scheduling information may correspond to each on-demand SI, or one scheduling information may correspond to a group of on-demand SI. The SI mapping table may be an index list or a bitmap indicating a SI index (SIB index). The bitmap indicates whether SIB1~SIBn (n is a positive integer, for example, n=20) is included, if yes, then bit 1 is used; otherwise, bit 0 is used.

The UE can determine whether it is necessary to receive the on-demand SI sent by the network side device by using the foregoing SI mapping table. For example, if the on-demand SI required by the UE is included, it is necessary to receive, and if the on-demand SI required by the UE is not included, it is not necessary to receive. Thereby, it is possible to reduce some unnecessary reception, for example, to avoid receiving on-demand SI that is not required by the UE. In addition, the on-demand SI is received in the broadcast period corresponding to the first scheduling information, and the broadcast period may be determined by the foregoing SI period, or may be pre-negotiated by the UE and the network side device, which is not limited herein.

The SI period may be a broadcast period of the on-demand SI, or may be a transmission period of the on-demand SI, that is, a time interval at which the network side transmits the on-demand SI. Optionally, the above SI period can be represented by the number of radio frames, for example: {rf8, rf16, rf32, rf64, rf128, rf256, rf512}. In addition, the broadcast period of the on-demand SI may be longer than the broadcast period (transmission period) of the periodically broadcasted SI, for example, the former may be an integral multiple of the latter. The UE can receive the on-demand SI sent by the network side device within the SI period. Of course, whether to receive the on-demand SI is determined by combining or not combining the SI mapping table. The on-demand SI is received and then it is determined whether or not the on-demand SI required by the UE is included. The on-demand SI may be received when the next period arrives, or within the SI time window.

The above information time window may be a time window length at which the UE receives the on-demand SI. Optionally, the above SI time window can be expressed in milliseconds, for example: {ms1, ms2, ms5, ms10, ms15, ms20, ms40}. In addition, in the SI time window, Physical Downlink Control Channel (PDCCH) scrambled by the SI-radio network temporary identifier (SI-RNTI) (for example, OD-SI-RNTI) indicates whether to transmit the on-demand SI on a certain sub-frame, the UE can be addressed by the SI-RNTI. In addition, the UE may also combine multiple sub-frames to receive SI by HARQ (Hybrid Automatic Repeat reQuest) retransmission combining (without ACK/NACK feedback) to improve SI reception performance. Similarly, the broadcast period may be determined by the foregoing SI period, or may be pre-negotiated by the UE and the network side device, which is not limited herein.

The starting point may be a starting point of each time interval of the transmission opportunity for the network side device to send the on-demand SI, or may be a starting position of the SI time window in each SI period (for example, the starting wireless frame, starting sub-frame). Through the starting point, the UE can receive the on-demand SI sent by the network side device in time.

The number of transmissions may be the number of times the network side device sends the on-demand SI, or may be the number of times of the transmission opportunity for sending the on-demand SI. The number of transmissions herein may be the number of times the network side device transmits the on-demand SI in continuous broadcast periods, or may be the number of times the network side device sends the on-demand SI within a modification period of one SI. Optionally, the number of transmissions described above can be represented by an integer, for example: {1, 2, 4, 8, . . . , infinite}, where infinite means keep sending, that is, within a modification period of a SI, the on-demand SI is sent in every broadcast period. The number of transmissions enables the UE to know how many times the SI is sent by the network side device, so that the network side device does not need to send a transmission indication every time before sending the on-demand SI, thereby saving network resources and overhead of system signaling.

It should be noted that, in some embodiments of the present disclosure, the first scheduling information may be implemented by any one of the above parameter configurations, and is not limited to include multiple or all parameter configurations. For some different application scenarios, different parameter configurations may be included. For example, the scheduling information of the broadcasted on-demand SI (OD SI) may include a SI period, a SI time window, a starting point, and a transmission number. The scheduling information of the OD SI sent by the multicast may include the SI time window and the starting point.

Optionally, the receiving, by the UE, the first scheduling information of the on-demand SI from the network side device includes: receiving, by the UE, SI periodically broadcasted (periodic broadcast SI) by the network side device, and the periodic broadcast SI includes the first scheduling information of the on-demand SI.

In this embodiment, the first scheduling information of the on-demand SI may be sent by periodically broadcasted SI. In addition, the periodically broadcasted SI may be SI including only the first scheduling information of the on-demand SI. Of course, in some scenarios, the periodically broadcasted SI may further include other SI that needs to be periodically broadcasted, for example, MIB, SIB1 and SIB2.

Optionally, the obtaining, by the UE, the on-demand SI sent by the network side device based on the first scheduling information, includes: if the first scheduling information includes a predefined parameter configuration, using, by the UE, the parameter configuration included in the first scheduling information to receive the on-demand SI sent by the network side device; or if the first scheduling information includes a predefined parameter configuration and the on-demand SI corresponding to the first scheduling information includes the on-demand SI required by the UE, using, by the UE, the parameter configuration included in the first scheduling information to receive the on-demand SI sent by the network side device.

The foregoing predefined parameter configuration may be a SI mapping table, a SI period, a SI time window, a starting point, and a SI transmission number, that is, the foregoing predefined parameter configuration includes the five parameter configurations. Certainly, in some scenarios, the foregoing predefined parameter configuration may be part of the SI mapping table, the SI period, the SI time window, the starting point, and the SI transmission number, for example, the SI mapping table and SI period, the SI time window and the starting point; or the SI mapping table, the SI period and the starting point, etc., which are not limited herein. In addition, the above-mentioned predefined parameter configuration may also be referred to as a complete parameter configuration.

If the first scheduling information includes a predefined parameter configuration, the UE may directly receive the on-demand SI sent by the network side device by using the parameter configuration included in the first scheduling information, thereby reducing the operations performed by the UE. For example, the first scheduling information includes the complete parameter configuration, which can be used for broadcast transmission of network-triggered on-demand SI, for example, SI of a public warning system (PWS, including ETWS and CMAS), SI of cell reselection, the updated on-demand SI, etc. Then, the UE can acquire the on-demand SI according to the scheduling information.

In addition, in this embodiment, if the first scheduling information includes a predefined parameter configuration, and the on-demand SI corresponding to the first scheduling information includes the on-demand SI required by the UE, the UE receives the on-demand SI sent by the network side device by using the parameter configuration included in the first scheduling information, thereby preventing the UE from receiving the on-demand SI that is not required by the UE. For example, if the UE receives the scheduling information of the on-demand SI, and the scheduling information includes the complete parameter configuration, the UE checks whether the SI required by the UE is included, and if yes, the UE obtains the SI required by the UE according to the scheduling information; if no, UE sends an on-demand SI request message to the network system device, the on-demand SI request message is described as below.

Optionally, the obtaining, by the UE, the on-demand SI sent by the network side device based on the first scheduling information, includes: determining, by the UE, whether an on-demand SI request message needs to be sent to the network side device based on the first scheduling information; if yes, the UE sends the on-demand SI request message to the network side device, the on-demand SI request message is used to request on-demand SI required by the UE; receiving, by the UE, an on-demand SI response message sent by the network side device.

The UE may send the SI request message to the network side device to request SI required by the UE. For example, if the on-demand SI required by the UE is SIB3 and SIB4, the UE may send a SI request message corresponding to SIB3 and SIB4 to the network side device.

After receiving the SI request message, the network side device may send the SI response message according to the SI request message. Alternatively, the network side device may send an on-demand SI response message according to the on-demand SI request message sent by the UE and the on-demand SI that may be provided by the network side device. The SI response message may include all or part of the on-demand SI required by the UE. Certainly, in some scenarios, the SI response message may not include the on-demand SI required by the UE. If the on-demand SI response message received by the UE does not include the SI required by the UE, the UE knows that the network side cannot provide the SI required by the UE. In addition, if the UE does not receive feedback from the network side, the request of the on-demand SI fails, the UE can perform a next scheduling process of the on-demand SI. In addition, the above-mentioned on-demand SI response message may further include all or part of on-demand SI required by other UEs, or does not include on-demand SI required by other UEs. The above-mentioned on-demand SI response message may include a SI table index, so that the UE may search for the on-demand SI corresponding to the SI table index from the saved SI table. The on-demand SI corresponding to the SI table index may include all or part of the on-demand SI required by the UE, or does not include SI required by the UE. The on-demand SI corresponding to the SI table index may include all or part of the on-demand SI required by other UEs, or the on-demand SI corresponding to the SI table index may not include the on-demand system required by other UEs.

In some embodiments, the on-demand SI request message sent by the UE may be used to send the on-demand SI, thereby avoiding broadcasting the on-demand SI not required by the UE, so as to avoid waste of transmission resources.

In addition, the network side device may use PDCCH scrambled by the SI-RNTI to schedule an on-demand SI response message, and each UE may be addressed through the SI-RNTI. For transmitting the on-demand SI response message in a broadcast mode, the network side may repeatedly send the on-demand SI, and the UE improves receiving performance of the SI by using HARQ retransmission combining (without ACK/NACK feedback).

The determining whether to send an on-demand SI request message to the network side device based on the first scheduling information may determine that the on-demand SI corresponding to the first scheduling information does not include all or part of the on-demand SI required by the device based on the first scheduling information, or the parameter configuration included in the first scheduling information is not complete, that is, some parameter configuration required by the UE is not included in the first scheduling information.

Optionally, the method further includes: if the SI response message does not include all or part of the on-demand SI required by the UE, the UE resends the on-demand SI request message; or if the UE does not receive the SI response message within a predefined or pre-configured time period, the UE resends the on-demand SI request message.

In this way, when all or part of the on-demand SI required by the UE is not included in the SI response message, or the SI response message is not received within a predefined or pre-configured time period, the UE resends the on-demand SI request message. For example, the on-demand SI required by the UE is SIB3, but the SI response message does not include SIB3, the UE needs to resend the SI request message.

The predefined or pre-configured time period can be understood as a predefined or pre-configured monitoring time. If the corresponding SI response message is not detected within the monitoring time, transmission of the SI request is failed, and the SI request needs to be resent.

Optionally, the determining, by the UE, whether an on-demand SI request message needs to be sent to the network side device based on the first scheduling information, includes: determining, by the UE, whether the on-demand SI corresponding to the first scheduling information includes the on-demand SI required by the UE, and if not, determining that on-demand SI request message needs to be sent to the network side device; or determining, by the UE, whether the parameter configuration included in the first scheduling information includes only a first part of the parameter configuration, and if yes, determines that the on-demand SI request message needs to be sent to the network side device.

In this embodiment, the on-demand SI corresponding to the first scheduling information does not include the on-demand SI required by the UE, or the parameter configuration included in the first scheduling information includes only the first part of the parameter configuration, the on-demand SI request message needs to be sent. The first part of parameter configuration may be preset, for example, a SI mapping table, a SI period, a SI time window, and a starting point; or a part of the SI mapping table, the SI period, and the starting point are set to be the first part of the parameter configuration, that is, as long as the first scheduling information does not include the above five parameter configuration, it is determined that the parameter configuration included in the first scheduling information includes only the first part of the parameter configuration. Or the first part of the parameter configuration may be defined as a part of parameter configuration in predefined parameter configuration. For example, if the UE receives the scheduling information of the on-demand SI, and a part of the parameter configuration (for example, one or more of a SI mapping table, a SI period, a SI time window, and a starting point) included in the scheduling information can be used for broadcast/multicast transmission of on-demand SI requested by the UE, then the UE determines that an on-demand SI request message needs to be sent.

Optionally, the foregoing UE acquires the on-demand SI sent by the network side device based on the first scheduling information, and further includes: receiving, by the UE, a SI modification indication sent by the network side device; receiving, by the UE, a second scheduling information of the on-demand SI sent by the network side device based on the SI modification indication, the on-demand SI corresponding to the second scheduling information includes the on-demand SI required by the UE, and the second scheduling information includes a predefined parameter configuration.

The receiving, by the UE, the on-demand SI response message sent by the network side device, includes: receiving, by the UE, the on-demand SI response message sent by the network side device by using the parameter configuration included in the second scheduling information.

The SI modification indication is used to notify the UE the modification of SI. After the UE determines the modification of the SI according to the SI modification indication, the second scheduling information of the on-demand SI sent by the network side device may be received. In addition, in this embodiment, the on-demand SI response message is corresponding to the second scheduling information, that is, the network side device sends the on-demand SI response message based on the second scheduling information, so that the UE uses parameter configuration included in the second scheduling information to receive the on-demand SI response message.

For example, in the scenario that the SI cannot be modified during the modification period of the SI, that is, the periodic broadcast SI and the scheduling information of the on-demand SI cannot be modified, and the network side device can send the SI modification indication in a paging message, to notify the UE of the modification of the SI. Then, the scheduling information (second scheduling information) of the new on-demand SI and the on-demand SI response message corresponding to the scheduling information are sent in the periodic broadcast SI in the modification period of the next SI. For example, the UE determines that the scheduling information does not include the SI required by the UE, and the on-demand SI list sent by the UE is {SIB3, SIB4}, and the network side sends a SI modification indication in the paging message to notify the UE of the modification of the SI. Then, the network side sends the scheduling information (including the complete parameter configuration of SIB3 and SIB4) of the new on-demand SI and an on-demand SI response message corresponding to the scheduling information, which includes SI of SIB3 and SIB4, in the periodic broadcast SI in the modification period of the next SI based on the on-demand SI request message sent by the UE and the on-demand SI that can be provided by the UE. The modification period of the SI in the embodiment of the present disclosure may be predefined by the network side device, or may be pre-negotiated by the network side device and the UE, which is not limited herein.

It should be noted that the UE is not limited to receive the second scheduling information in the modification period of the next SI. For example, the second scheduling information may be received in the modification period of the current SI based on the SI modification indication. It may also be applied to a scenario that SI is modified during a modification period of SI.

It should be noted that, in the embodiment of the present disclosure, the description of the predefined parameter configuration may be referred to the related description when the parameter configuration is configured in the first time, and is not described repeatedly.

Optionally, the method further includes: if the UE determines based on the SI modification indication that all or part of the on-demand SI required by the UE does not include in the on-demand modified by the network side device, the UE resends the on-demand SI request message.

In this embodiment, all or part of the on-demand SI required by the UE does not include in the on-demand modified by the network side device and the UE resends the on-demand SI request message. For example, the on-demand SI required by the UE is SIB3, but the on-demand SI provided by the network side device before the modification does not include the SIB3, and the on-demand information provided by the network side device after the modification indicated by the SI modification indication does not include SIB3, so the UE needs to resend the SI request message.

In addition, it is also possible to implement that all or part of the on-demand SI required by the UE is not included in the on-demand SI modified by the network side device, and the UE may not receive the second scheduling information, that is, the second scheduling information may be received in the case that it is determined that the on-demand SI modified by the network side device includes the on-demand SI required by the UE.

Optionally, the obtaining, by the UE, the on-demand SI sent by the network side device based on the first scheduling information further includes: receiving, by the UE, third scheduling information of the on-demand SI sent by the network side device, where the on-demand SI corresponding to the third scheduling information includes on-demand SI required by the UE, and the third scheduling information includes a predefined parameter configuration.

The receiving, by the UE, the on-demand SI response message sent by the network side device includes: receiving, by the UE, the on-demand SI response message sent by the network side device by using the parameter configuration included in the third scheduling information.

In this embodiment, the third scheduling information may be directly transmitted, and as compared with the above embodiment, the transmission of the SI modification indication may be reduced to save network transmission resources. For example, in a scenario that the SI may be modified during the modification period of the SI, the periodic broadcast SI and the scheduling information of the on-demand SI may be modified. The network side device may send scheduling information (third scheduling information) of the new on-demand SI and the on-demand SI response message corresponding to the scheduling information in the periodical broadcast SI during the modification period of the current SI. For example, the UE determines that the scheduling information does not include the SI required by the UE, and the on-demand SI list sent by the UE is {SIB3, SIB4}, and the network side sends the scheduling information of the new on-demand SI (including the complete parameter configuration of SIB3 and SIB4) and the on-demand SI response message corresponding to the scheduling information, which includes SI of SIB3 and SIB4, in the periodical broadcast SI in the current SI modification period based on the on-demand SI request message sent by the UE and the on-demand SI provided by the network side device. In this way, the UE can obtain the on-demand SI required by the UE.

In addition, it may be also applied to the scenario that the SI cannot be modified in the modification period of the SI. For example, the UE may receive the third scheduling information in the modification period of the next SI by default.

Optionally, the obtaining, by the UE, the on-demand SI sent by the network side device based on the first scheduling information, and further includes: receiving, by the UE, fourth scheduling information of the on-demand SI sent by the network side device, where the on-demand SI corresponding to the fourth scheduling information includes on-demand SI required by the UE and the fourth scheduling information includes a second part of parameter configuration.

The receiving, by the UE, the on-demand SI response message sent by the network side device, comprises: if the parameter configuration included in the first scheduling information includes the first part of parameter configuration, receiving, by the UE, the on-demand SI response message sent by the network side device by using the first part of parameter configuration and the second part of parameter configuration.

In this embodiment, the second part of parameter configuration may be parameter configuration other than the first part of parameter configuration, for example, the first part of parameter configuration is part of the predefined parameter configuration, and the second part of parameter configuration is another part of the predefined parameter configuration. Of course, in some scenarios, the sum of the first part of parameter configuration and the second part of the parameter configuration may also be part of the predefined parameter configuration, which is not limited herein.

For example, in the scenario that the SI may be modified during the modification period of the SI, that is, the periodic broadcast SI and the scheduling information of the on-demand SI may be modified, and the network side device can send the scheduling information (fourth scheduling information) of the new on-demand SI and the on-demand SI response message corresponding to the scheduling information in the periodic broadcast SI in the modification period of the current SI. For example, the UE receives the first scheduling information (including part of parameter configuration, for example, the SI mapping table is {SIB5, SIB6}, SI period is 8rf and SI time window is 5 ms) of the on-demand SI. The network side device sends the scheduling information of the new on-demand SI (another part of parameter configuration including SIB5 and SIB6, for example, a starting radio frame starting from SFN mod 8=0 and the second starting sub-frame in the radio frame, the number of transmission is 2, that is the fourth scheduling information) and an on-demand SI response message corresponding to the scheduling information, which includes SI of SIB5 and SIB6, in the periodic broadcast SI in the modification period of the current SI based on the on-demand SI request message sent by the UE and the on-demand SI that can be provided by the network side device. The UE may use the first part of parameter configuration and the second part of parameter configuration to receive information, so as to reduce the overhead of the fourth scheduling information and save network resources.

It may also be applied to a scenario that SI cannot be modified during a modification period of SI. For example, the UE may receive the fourth scheduling information by default in the modification period of the next SI.

Optionally, the obtaining, by the UE, the on-demand SI sent by the network side device based on the first scheduling information further includes: receiving, by the UE, a transmission indication sent by the network side device, the transmission indication is used to indicate that the SI response message is sent according to the first scheduling information.

The receiving, by the UE, the on-demand SI response message sent by the network side device, includes: receiving, by the UE, the on-demand SI response message sent by the network side device by using the parameter configuration included in the first scheduling information.

In this implementation, the transmission indication is used to notify UE that SI response message is sent according to the first scheduling information, so that the UE uses the parameter configuration included in the first scheduling information to receive the on-demand SI response message sent by the network side device. The transmission of other scheduling information may be avoided so as to save network resources. The parameter configuration included in the first scheduling information may be a predefined parameter configuration, or may be a part of parameter configuration, for example, the first part of parameter configuration described above.

For example, in a scenario where the SI is variable during the modification period of the SI, the periodic broadcast SI and the scheduling information of the on-demand SI therein are variable. The network side device sends a transmission indication (1 bit indication or list) and an on-demand SI response message corresponding to the first scheduling information in the SI periodically broadcasted during the modification period of the current SI. For example, the UE receives the first scheduling information of the on-demand SI (including part of the parameter configuration, for example, the SI mapping table is {SIB7}, the SI period is 16rf, the SI time window is 5 ms, and the starting radio frame having a starting point of SFN mod 16=1 and the third starting sub-frame of the radio frame). The on-demand SI list sent by the UE is {SIB7}, and the network side device transmits a transmission indication (for example, 1 bit indicates that the SIB7 is transmitted according to the original scheduling information), and an on-demand SI response message corresponding to the original scheduling information including SI of the SIB7 in the SI periodically broadcasted during the modification period of the current SI, according to the on-demand SI request message sent by the UE combined with the on-demand SI that can be provided by the network side device.

Similarly, a scenario in which the SI is not variable in the modification period of the SI may be applied. For example, the terminal may receive the transmission indication by default in a modification period of a next SI.

Optionally, the foregoing method further includes: receiving, by the UE, the indication information sent by the network side device, where the indication information is indication information that the network side device provides on-demand SI; sending, by the UE, an on-demand SI request message to the network side device according to the indication information, where the on-demand SI request message is used to request on-demand SI required by the UE.

The receiving, by the UE, the first scheduling information of the on-demand SI sent by the network side device, includes: receiving, by the UE, the first scheduling information of the on-demand SI required by the UE sent by the network side device.

The obtaining, by the UE, the on-demand SI sent by the network side device based on the first scheduling information, includes: receiving, by the UE, the on-demand SI response message sent by the network side device by using the parameter configuration included in the first scheduling information.

In this implementation, an on-demand SI request message may be sent according to the foregoing indication information. For example, if the indication information indicates that the network side device provides on-demand SI, the UE can send an on-demand SI request message. The first scheduling information sent by the network side device is the first scheduling information of the on-demand SI required by the UE, so that the UE can receive the response message of the on-demand SI by using the first scheduling information. Of course, the above SI response message may include all or part of the on-demand SI required by the UE. Certainly, in some scenarios, the SI response message may not include the on-demand SI required by the UE. If the on-demand SI response message received by the UE does not include the SI required by the UE, the UE knows that the network side device cannot provide the SI required by UE. In addition, if the UE does not receive feedback from the network side, the request of the on-demand SI is failed. The UE can perform the next scheduling process of the on-demand SI. In addition, the indication information may be the periodic broadcast SI, that is, the network side device transmits the indication information by the periodic broadcast SI.

Optionally, the indication information is used to indicate whether the network side device provides the on-demand SI, or the indication information includes a SI list of the on-demand SI provided by the network side device.

The sending, by the UE, the on-demand SI request message to the network side device based on the indication information, includes: if the indication information indicates that the network side device provides on-demand SI, sending, by the UE, the on-demand SI request message to the network side device; or if the on-demand SI indicated by the SI list includes on-demand SI required by the UE, sending, by the UE, an on-demand SI request message to the network side device.

In this implementation, the foregoing indication information may be divided into two types, one is to indicate whether the network side device provides the on-demand SI, for example, 1 bit is used, 1 indicates yes, 0 indicates no; or True means that the network side device provides the on-demand SI, an no indication means that the network side device does not provide the on-demand SI. The other is to indicate which on-demand SI is provided by the network side device. The on-demand SI may be an index list, or a bitmap indicating an SIB index, where the bitmap indicates whether SIB1~SIBn (n is a positive integer, for example, n=20) is provided, if yes, it is represented by 1; otherwise, it is represented by 0. In this embodiment, it is indicated whether the on-demand SI is provided in a next broadcast period or a current modification period or a next modification period.

In this way, if the UE receives the indication of the on-demand SI being 1 or true, the network side device can provide the on-demand SI, the UE sends the on-demand SI request message. If the UE receives an on-demand SI list indicating which on-demand SI is provided by the network side device, the UE determines whether the SI required by the UE is included, and if yes, the UE sends the on-demand SI request message.

For example, for the indication information being 1 or true, after receiving the above-mentioned on-demand SI request message sent by the UE, the network side device may send the first scheduling information of the on-demand SI (which may include a complete parameter configuration), and an on-demand SI response message corresponding to the scheduling information in the SI periodically broadcasted during the modification period of the current SI. For example, the UE receives the indication of the on-demand SI being 1 or true, the network side device can provide the on-demand SI, and the on-demand SI list sent by the UE is {SIB13}, and the network side device sends the scheduling information of the new on-demand SI (including the complete parameter configuration of SIB13) and the on-demand SI response message corresponding to the scheduling information, which includes the SI of the SIB13 in the SI periodically broadcasted during modification period of the current SI, according to the on-demand SI request message sent by the UE combined with the on-demand SI that can be provided by the UE.

For example, the on-demand SI provided by the network side device includes the SI required by the UE, and after receiving the above-mentioned on-demand SI request message sent by the UE, the network side device can send the first scheduling information (which may include a complete parameter configuration) of the on-demand SI and the on-demand SI response message corresponding to the scheduling information in the SI periodically broadcasted during the modification period of the current SI. For example, UE 1 and UE 2 receive the on-demand SI list {00111111110000000000}, which indicates that the network side device provides SIB3~SIB10, and the UE5 check the SI SIB8 required by the UE5, and the on-demand SI list sent by the UE 1 is {SIB8}, UE6 check the SI SIB9 required by UE6, and the on-demand SI list sent by the UE 2 is {SIB9}, and the network side device sends the scheduling information of new on-demand SI (including the complete parameter configuration of SIB8 and SIB9) and the on-demand SI response message corresponding to the scheduling information, which includes SI of SIB8 and SIB9 in the SI periodically broadcasted during the modification period of the current SI, based on the on-demand SI request message sent by UE 1 and UE 2 combined with the on-demand SI that can be provided by the network side device.

Optionally, the sending, by the UE, an on-demand SI request message to the network side device, includes: sending, by the UE, an on-demand SI request message to the network side device by using Msg3 of a random access procedure; or sending, by the UE, an on-demand SI request message to the network side device by using an RRC message; or sending, by the UE, an on-demand SI request message to the network side device by using a MAC CE.

In this implementation, the on-demand SI request message is sent to the network side device by using Msg3, the RRC message, or the MAC CE in the random access procedure. For example, the UE in an idle/inactive state sends the on-demand SI request message through the random access procedure. That is, the Msg3 of the random access procedure includes the on-demand SI request message, which includes an on-demand SI list. For example, when the SI required by the UE is SIB3 and SIB4, the on-demand SI list included in the on-demand SI request message sent by the UE is {SIB3, SIB4} or {00110000000000000000}. For another example, the UE in a connected state sends an on-demand SI request message through the RRC message or the MAC CE. That is, the RRC message or MAC CE includes the on-demand SI request message, which includes the on-demand SI list.

Optionally, the foregoing method further includes: obtaining, by the UE, mapping relationship information between an uplink signal and the on-demand SI.

The sending, by the UE, the on-demand SI request message to the network side device, includes: sending, by the UE, the uplink signal to the network side device, where there is a mapping relationship between the uplink signal and the on-demand SI required by the UE.

In this embodiment, the mapping relationship information may be obtained from the periodic broadcast SI, that is, the periodic broadcast SI sent by the network side device includes the mapping relationship information, or the mapping relationship information is preset by the UE, thereby obtaining the mapping relationship information locally. In this implementation, the uplink signal may be sent to notify the network side device of the on-demand SI required by the UE. The uplink signal is sent based on an existing process, thereby reducing the communication process, and improving the UE and the network side device. Of course, the network side device also obtains the above mapping relationship information in advance. For example, the UE in an idle/inactive state sends the on-demand SI request message through an uplink signal process. That is, the UE sends an uplink signal (for example, a Preamble, a Sync code, etc.), and there is a mapping table between the uplink signal and the on-demand SI. For example, Preamble1 corresponds to SIB3, and Preamble2 corresponds to SIB4 or Preamble3 corresponds to SIB3 and SIB4.

It should be noted that the embodiments described in the present disclosure may be implemented in combination, or may be implemented separately, which is not limited thereto.

In the embodiment of the present disclosure, the UE receives the first scheduling information of the on-demand SI sent by the network side device, and the UE acquires the on-demand SI sent by the network side device according to the first scheduling information. In this way, SI can be sent on demand, as compared with all SI being periodically broadcasted in the related art, the embodiments of the present disclosure can reduce SI overhead.

Figure 3:
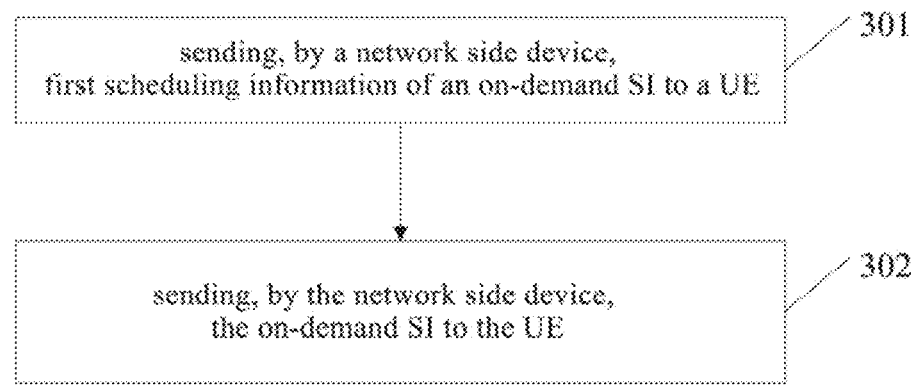
FIG. 3 is another flow chart showing a SI obtaining method according to some embodiments of the present disclosure.

Referring to FIG. 3, an embodiment of the present disclosure further provides a SI obtaining method, as shown in FIG. 3, including the following steps.

Step 301, sending, by a network side device, first scheduling information of an on-demand SI to a UE;

Step 302, sending, by the network side device, the on-demand SI to the UE.

The UE can obtain the on-demand SI sent by the network side device based on the first scheduling information in Step 302. The embodiment shown in FIG. 2 is referred for detail.

Optionally, the first scheduling information includes one or more parameter configurations: a SI mapping table, a SI period, a SI time window, a starting point, and a transmission number of SI, where the SI mapping table is used to indicate the on-demand SI corresponding to the first scheduling information.

Optionally, the sending, by the network side device, the first scheduling information of the on-demand SI to the UE, includes: broadcasting periodically, by the network side device, the SI, and the SI periodically broadcasted includes the first scheduling information of the on-demand SI.

Optionally, the method further includes: receiving, by the network side device, an on-demand SI request message sent by the UE, where the on-demand SI request message is used to request the on-demand SI required by the UE.

The sending, by the network side device, the on-demand SI to the UE, includes: sending, by the network side device, an on-demand SI response message to the UE.

Optionally, the method further includes: sending, by the network side device, a modification indication of the SI to the UE.

The network side device sends, to the UE, second scheduling information of the on-demand SI, where the on-demand SI corresponding to the second scheduling information includes the on-demand SI required by the UE, and the second scheduling information includes a predefined parameter configuration.

The sending, by the network side device, the on-demand SI response message to the UE, includes: sending, by the network side device, an on-demand SI response message to the UE based on the parameter configuration included in the second scheduling information.

Optionally, the method further includes: sending, by the network side device, third scheduling information of the on-demand SI, where the on-demand SI corresponding to the third scheduling information includes the on-demand SI required by the UE, and the third scheduling information includes the predefined parameter configuration.

The sending, by the network side device, the on-demand SI response message to the UE, includes: sending, by the network side device, the on-demand SI response message to the UE based in the parameter configuration included in the third scheduling information.

Optionally, the method further includes: if the parameter configuration included in the first scheduling information includes only a first part of parameter configuration, sending, by the network side device, fourth scheduling information of the on-demand SI to the UE, where the on-demand SI corresponding to the fourth scheduling information includes the on-demand SI required by the UE, and the fourth scheduling information includes a second part of parameter configuration.

The sending, by the network side device, the on-demand SI response message to the UE, includes: sending, by the network side device, the on-demand SI response message to the UE based the first part of parameter configuration and the second part of parameter configuration.

Optionally, the method further includes: sending, by the network side device, a transmission indication to the UE, where the transmission indication is used to indicate that the SI response message is sent according to the first scheduling information.

The sending, by the network side device, the on-demand SI response message to the UE, includes: sending, by the network side device, the on-demand SI response message to the UE according to the parameter configuration included in the first scheduling information.

Optionally, the method further includes: sending, by the network side device, the indication information to the UE, where the indication information is used to indicate that the network side device provides the on-demand SI; receiving, by the network side device, the on-demand SI request message sent by the UE based on the indication information, where the on-demand SI request message is used to request the on-demand SI required by the UE.

The sending, by the network side device, the first scheduling information of the required SI to the UE, includes: sending, by the network side device, the first scheduling information of the on-demand SI required by the UE to the UE.

The sending, by the network side device, the on-demand SI to the UE, includes: sending, by the network side device, the on-demand SI response message to the UE based on the parameter configuration included in the first scheduling information.

Optionally, the indication information is used to indicate whether the network side device provides the on-demand SI; or the indication information includes a SI list of the on-demand SI provided by the network side device.

Optionally, the receiving, by the network side device, the on-demand SI request message sent by the UE, includes: receiving, by the network side device, the on-demand SI request message sent by the UE through Msg3 of the random access procedure; or receiving, by the network side device, the on-demand SI request message sent by the UE by using an RRC message; or receiving, by the network side device, the on-demand SI request message sent by the UE by using a MAC CE.

Optionally, the method further includes: sending, by the network side device, mapping relationship information between the uplink signal and the on-demand SI to the UE.

The receiving, by the network side device, the on-demand SI request message sent by the UE, includes: receiving, by the network side device, the uplink signal sent by the UE, where there is a mapping relationship between the uplink signal and the on-demand SI required by the UE.

It should be noted that the present embodiment is an implementation of the network side device corresponding to the embodiment shown in FIG. 2, and a specific implementation of the embodiment may refer to the related description of the embodiment shown in FIG. 2, so as to avoid repeated description. In this embodiment, the overhead of the SI can also be reduced.

A plurality of examples is used to illustrate the above embodiments

Example 1

Figure 4:
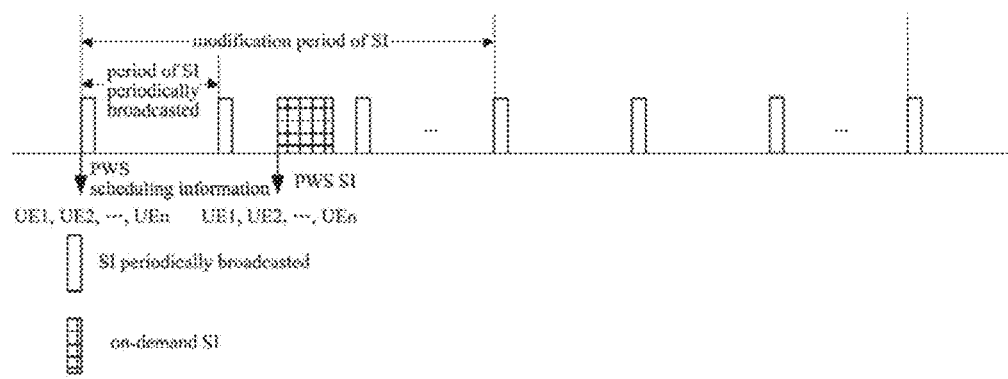
FIG. 4 is a schematic view showing on-demand SI scheduling trigged by a network side according to some embodiments of the present disclosure.

The UE in an idle/inactive state implements a scheduling process of the on-demand SI trigged by the network side. The schematic diagram of scheduling the on-demand SI triggered by the network side can be shown in FIG. 4, where the specific workflow is as follows.

Step 1: UE1, UE2, . . . , UEn (n is an integer) in the idle/inactive state receives SI periodically broadcasted by the network side device, including scheduling information of on-demand SI, and a complete parameter configuration, which may be used for broadcast transmission of the on-demand SI trigged by the network side, for example, the SI broadcast transmission of PWS (including ETWS and CMAS).

Step 2: The network side device broadcasts an on-demand SI response message based on the scheduling information, which includes SI of the PWS. Specifically, the network side uses PDCCH scrambled by SI-RNTI to schedule the on-demand SI response message.

Step 3: UE1, UE2, UEn receives the on-demand SI response message based on the scheduling information of PWS. Specifically, UE1, UE2, . . . , UEn are addressed through the SI-RNTI, thereby obtaining SI of the PWS.

Example 2

Figure 5:
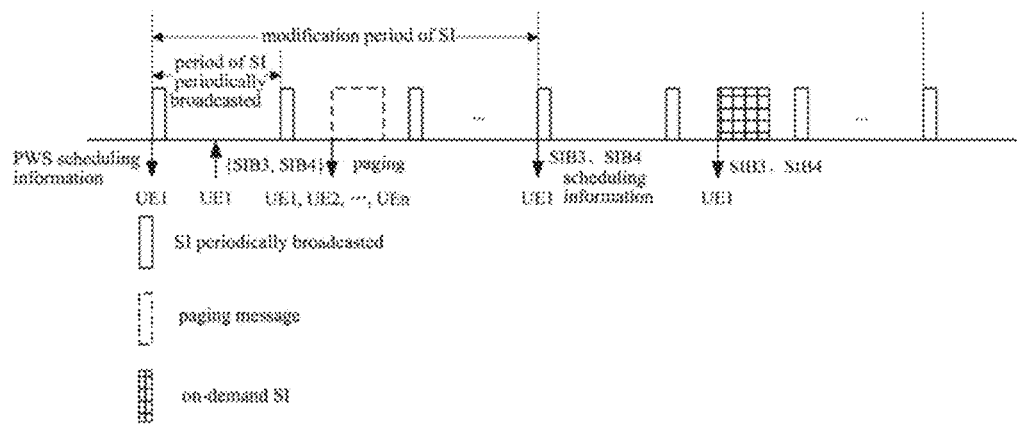
FIG. 5 is a schematic diagram of scheduling on-demand SI based on scheduling information of the on-demand SI according to an embodiment of the present disclosure.

In this example, the SI is unchanged during the modification period of the SI, and the UE in the idle/inactive state receives the scheduling information of the on-demand SI to perform an on-demand SI scheduling process. A schematic diagram scheduling the on-demand SI based on the scheduling information of the on-demand SI can be shown in FIG. 5. The specific workflow is as follows.

Step 1: UE1 in the idle/inactive state receives the SI periodically broadcasted by the network side, which includes the scheduling information of the on-demand SI, and includes complete parameter configuration, for example, SI broadcast transmission of PWS (including ETWS and CMAS).

Step 2: UE1 checks whether SI of SIB3 and SIB4 required by UE1 is included. If no, UE1 sends an on-demand SI request message to the network side, where the on-demand SI list is {SIB3, SIB4}.

Step 3: Since the SI is not variable during the modification period, the scheduling information of the on-demand SI is not variable, and the network side sends a SI modification indication (systemInfoModification) in a paging message to notify UE1, UE2, UEn (n is an integer) of the change of SI to be occurred.

Step 4: The network side device sends a new scheduling information of the on-demand SI (including the complete parameter configuration of SIB3 and SIB4) and the on-demand SI response message corresponding to the scheduling information, which includes SI of SIB3 and SIB4, in the SI periodically broadcasted in the next modification period based on the on-demand SI request message sent by the UE1, combined with the on-demand SI that can be provided by the network side device.

Step 5: UE1 receives the on-demand SI response message based on the scheduling information of SIB3 and SIB4. Specifically, UE1 is addressed through the SI-RNTI, thereby obtaining SI of SIB3 and SIB4.

Example 3

Figure 6:
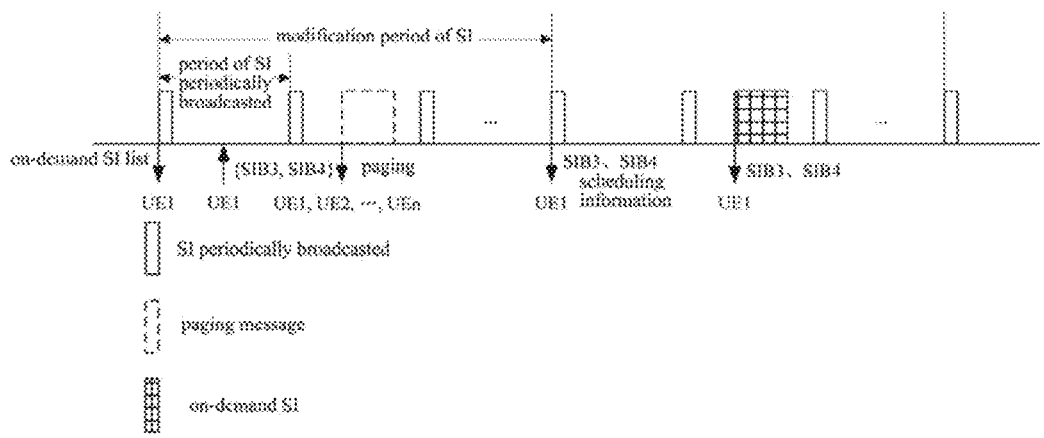
FIG. 6 is another schematic diagram of scheduling on-demand SI based on an on-demand SI list according to an embodiment of the present disclosure.

The SI is unchanged during the modification period of the SI, and the UE in the idle/inactive state receives the on-demand SI list to implement the scheduling process of the on-demand SI. A schematic diagram of scheduling the on-demand SI based on the on-demand SI list can be shown in FIG. 6. The specific workflow is as follows.

Step 1: UE1 in the idle/inactive state receives the SI periodically broadcasted by the network side, which includes an on-demand SI list {001111111110000000000}, indicating that the network side provides SIB3~SIB10.

Step 2: UE1 checks and determines SIB3 and SIB4 required by UE1 is included, and then UE1 sends an on-demand SI request message to the network side, where the on-demand SI list is {SIB3, SIB4}.

Step 3: Since the SI is not variable during the modification period, the scheduling information of the on-demand SI is not variable, and the network side sends a SI modification indication (systemInfoModification) in the paging message to notify UE1, UE2, . . . , UEn (n is an integer) of the change of the SI to be occurred.

Step 4: The network side device sends a new scheduling information of the on-demand SI (including the complete parameter configuration of SIB3 and SIB4) and the on-demand SI response message corresponding to the scheduling information, which includes SI of SIB3 and SIB4, in the SI periodically broadcasted in the next modification period based on the on-demand SI request message sent by the UE1, combined with the on-demand SI that can be provided by the network side device.

Step 5: UE1 receives the on-demand SI response message based on the scheduling information of SIB3 and SIB4. Specifically, UE1 is addressed through the SI-RNTI, thereby obtaining SI of SIB3 and SIB4.

In examples 4 to 7, the SI is variable within the modification period of the SI.

Example 4

Figure 7:
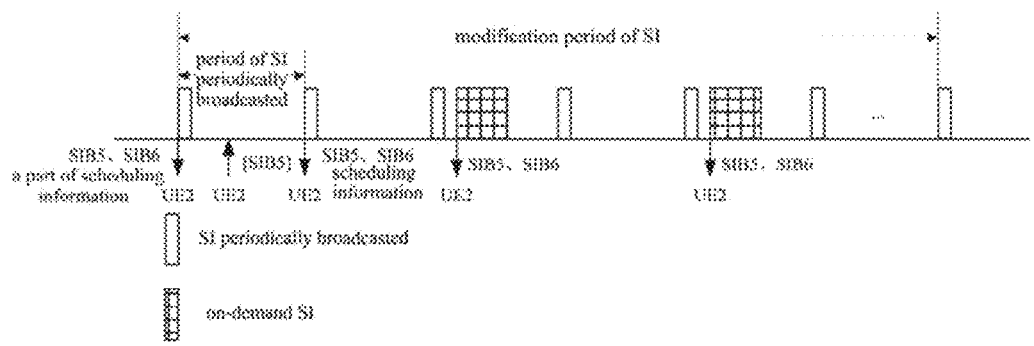
FIG. 7 is a schematic diagram of scheduling the on-demand SI based on scheduling information of a part of on-demand SI according to an embodiment of the present disclosure.

The UE in an idle/inactive state implements a scheduling process of the on-demand SI when receiving the scheduling information of a part of on-demand SI. The schematic diagram of scheduling the on-demand SI based on the scheduling information of a part of on-demand SI can be shown in FIG. 7, where the specific workflow is as follows.

Step 1: UE2 in the idle/inactive state receives SI periodically broadcasted by the network side device, including scheduling information of on-demand SI, and a part of parameter configuration. For example, the SI mapping table is {SIB5, SIB6}, The SI period is 8rf, and the SI time window is 5 ms.

Step 2: The on-demand SI required by UE2 is SIB5, and then UE2 sends an on-demand SI request message to the network side, where the on-demand SI list is {SIB5}.

Step 3: Since the SI is variable during the modification period, the scheduling information of the on-demand SI is variable, and the network side device sends the scheduling information of the new on-demand SI including another part of the parameter configuration of SIB5 and SIB6 (for example, a starting radio frame with the starting point of SFN mod 8=0 and the second starting sub-frame of the radio frame, the number of transmissions is 2) and the on-demand SI response message corresponding to the scheduling information, which includes SI of SIB5 and SIB6, in the SI periodically broadcasted in the current modification period based on the on-demand SI request message sent by the UE2 combined with the on-demand SI that can be provided by the network side device.

Step 4: UE2 receives the on-demand SI response message based on the scheduling information of SIB5 and SIB6. Specifically, the UE2 performs addressing through the SI-RNTI, thereby obtaining SI of SIB5 and SIB6.

Example 5

Figure 8:
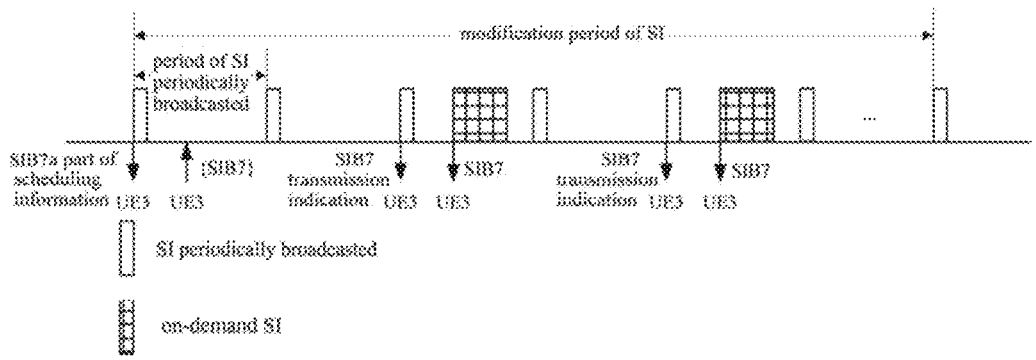
FIG. 8 is another schematic diagram of scheduling the on-demand SI based on scheduling information of a part of on-demand SI and a transmission indication according to an embodiment of the present disclosure.

The UE in an idle/inactive state implements a scheduling process of the on-demand SI when receiving the scheduling information of a part of on-demand SI and a transmission indication. The schematic diagram of scheduling the on-demand SI based on the scheduling information of a part of on-demand SI and the transmission indication can be shown in FIG. 8, where the specific workflow is as follows.

Step 1: UE3 in the idle/inactive state receives SI periodically broadcasted by the network side device, including scheduling information of on-demand SI, and a part of parameter configuration. For example, the SI mapping table is {SIB7}, The SI period is 16rf, and the SI time window is 5 ms, a starting radio frame with a starting point of SFN mod 16, and a third starting sub-frame of the radio frame.

Step 2: The on-demand SI required by UE3 is SIB7, and then UE3 sends an on-demand SI request message to the network side, where the on-demand SI list is {SIB7}.

Step 3: Since the SI is variable during the modification period, the SI periodically broadcasted is variable, and the network side device sends the transmission indication (for example, 1 bit indicates that SIB 7 is sent based on the original scheduling information) and the on-demand SI response message corresponding to the original scheduling information, which includes SI of SIB7, in the SI periodically broadcasted in the current modification period based on the on-demand SI request message sent by the UE3 combined with the on-demand SI that can be provided by the network side device.

Step 4: UE3 receives the on-demand SI response message based on the transmission indication of SIB7 and the original scheduling information. Specifically, the UE3 performs addressing through the SI-RNTI, thereby obtaining SI of SIB7.

Example 6

Figure 9:
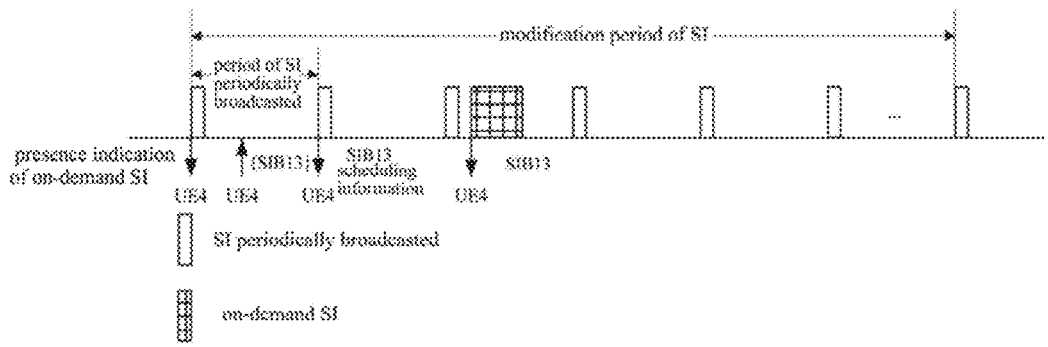
FIG. 9 is another schematic diagram of scheduling the on-demand SI according to an embodiment of the present disclosure.

The UE in an idle/inactive state implements a scheduling process of the on-demand SI when receiving a presence indication of 1 or True. The schematic diagram of scheduling the on-demand SI when the presence indication is 1 or True can be shown in FIG. 9, where the specific workflow is as follows.

Step 1: UE4 in the idle/inactive state receives SI periodically broadcasted by the network side device, including the presence indication of the on-demand SI that is 1 or True to indicate the network side device may provide the on-demand SI.

Step 2: The on-demand SI required by UE4 is SIB13, and then UE4 sends an on-demand SI request message to the network side, where the on-demand SI list is {SIB13}.

Step 3: Since the SI is variable during the modification period, the scheduling information of the on-demand SI is variable, and the network side device sends the scheduling information of a new on-demand SI (including complete parameter configuration of SIB13) and the on-demand SI response message corresponding to the scheduling information, which includes SI of SIB13, in the SI periodically broadcasted in the current modification period based on the on-demand SI request message sent by the UE4 combined with the on-demand SI that can be provided by the network side device.

Step 4: UE4 receives the on-demand SI response message based on the scheduling information of SIB13. Specifically, the UE4 performs addressing through the SI-RNTI, thereby obtaining SI of SIB13.

Example 7

Figure 10:
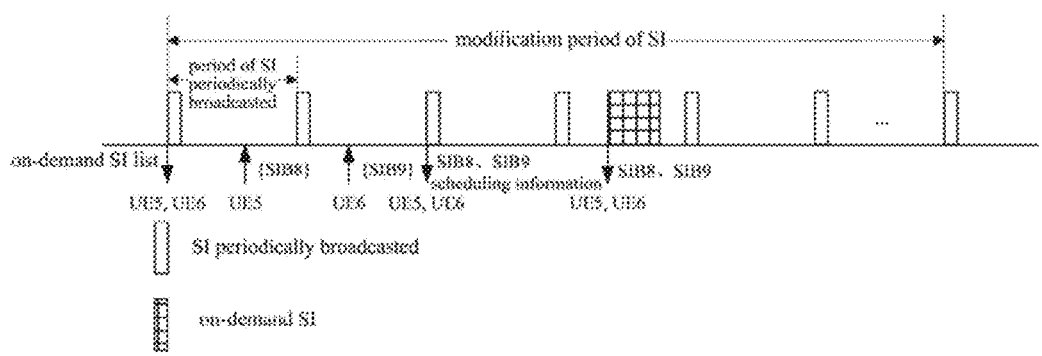
FIG. 10 is another schematic diagram of scheduling the on-demand SI based on the on-demand SI list according to an embodiment of the present disclosure.

The UE in an idle/inactive state implements a scheduling process of the on-demand SI when receiving an on-demand SI list. The schematic diagram of scheduling the on-demand SI when receiving an on-demand SI list can be shown in FIG. 10, where the specific workflow is as follows.

Step 1: UE5 and UE6 in the idle/inactive state receives SI periodically broadcasted by the network side device, including the on-demand SI list {001111111110000000000} to indicate the network side device may provide the on-demand SI.

Step 2: UE5 checks the on-demand SI required by UE5, and then the on-demand SI sent by UE5 is {SIB8}. UE6 checks the on-demand SI of SIB9 required by UE6, and then the on-demand SI list sent by UE6 is {SIB9}.

Step 3: Since the SI is variable during the modification period, the scheduling information of the on-demand SI is variable, and the network side device sends the scheduling information of a new on-demand SI (including complete parameter configuration of SIB8 and SIB9) and the on-demand SI response message corresponding to the scheduling information, which includes SI of SIB8 and SIB9, in the SI periodically broadcasted in the current modification period based on the on-demand SI request message sent by UE5 and UE6 combined with the on-demand SI that can be provided by the network side device.

Step 4: UE5 and UE6 receives the on-demand SI response message based on the scheduling information of SIB8 and SIB9. Specifically, UE5 and UE6 perform addressing through the SI-RNTI, thereby obtaining SI of SIB8 and SIB9.

Figure 11:
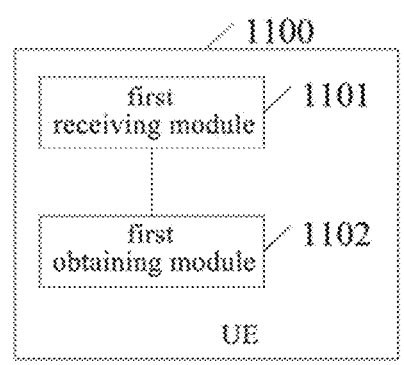
FIG. 11 is a schematic view showing a UE according to some embodiments of the present disclosure.

Referring to FIG. 11, an embodiment of the present disclosure provides a UE. As shown in FIG. 11, the UE 1100 includes: a first receiving module 1101, configured to receive first scheduling information of the on-demand SI sent by the network side device; a first obtaining module 1102, configured to acquire the on-demand SI sent by the network side device based on the first scheduling information.

Optionally, the first scheduling information includes one or more parameter configurations: a SI mapping table, a SI period, a SI time window, a starting point, and a transmission number of SI, wherein the SI mapping table is used to represent the on-demand SI corresponding to the first scheduling information.

Optionally, the first receiving module 1101 is configured to receive SI periodically broadcasted by the network side device, where the SI periodically broadcasted includes first scheduling information of the on-demand SI.

Optionally, the first obtaining module 1102 is configured to: if the first scheduling information includes a predefined parameter configuration, use the parameter configuration included in the first scheduling information to receive the on-demand SI sent by the network side device; or the first obtaining module 1102 is configured to: if the first scheduling information includes a predefined parameter configuration, and the on-demand SI corresponding to the first scheduling information includes on-demand SI required by the UE, use the parameter configuration included in the first scheduling information to receive the on-demand SI sent by the network side device.

Figure 12:
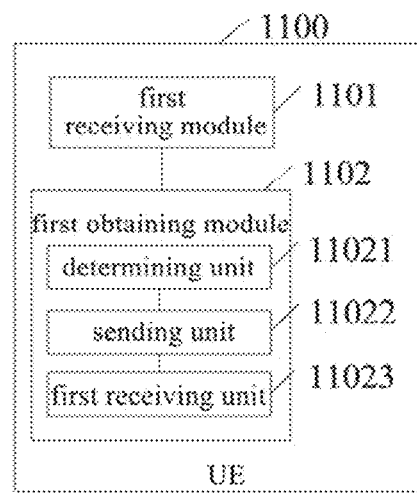
FIG. 12 is another schematic view showing a UE according to some embodiments of the present disclosure.

Optionally, as shown in FIG. 12, the first obtaining module 1102 includes: a determining unit 11021, configured to determine whether an on-demand SI request message needs to be sent to the network side device based on the first scheduling information; a sending unit 11022, configured to: if it is determined that the on-demand SI request message needs to be sent to the network side device, send the on-demand SI request message to the network side device, where the on-demand SI request message is used request on-demand SI required by the UE; and a first receiving unit 11023, configured to receive an on-demand SI response message sent by the network side device.

Optionally, a determining unit 11021, configured to determine whether an on-demand SI request message needs to be sent to the network side device based on the first scheduling information; a sending unit 11022, configured to: if it is determined that the on-demand SI request message needs to be sent to the network side device, send the on-demand SI request message to the network side device, where the on-demand SI request message is used request on-demand SI required by the UE; and a first receiving unit 11023, configured to receive an on-demand SI response message sent by the network side device.

Figure 13:
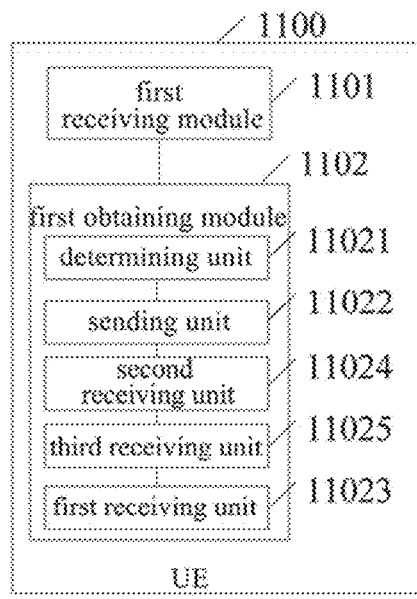
FIG. 13 is yet another schematic view showing a UE according to some embodiments of the present disclosure.

Optionally, as shown in FIG. 13, the first obtaining module 1102 further includes: a second receiving unit 11024, configured to receive a SI modification indication sent by the network side device; a third receiving unit 11025, configured to: receive the second scheduling information of the on-demand SI sent by the network side device based on the SI modification indication where the on-demand SI corresponding to the second scheduling information includes the on-demand SI required by the UE, and the second scheduling information includes a predefined parameter configuration; and a first receiving unit 11023, configured to receive an on-demand SI response message sent by the network side device by using a parameter configuration included in the second scheduling information.

Figure 14:
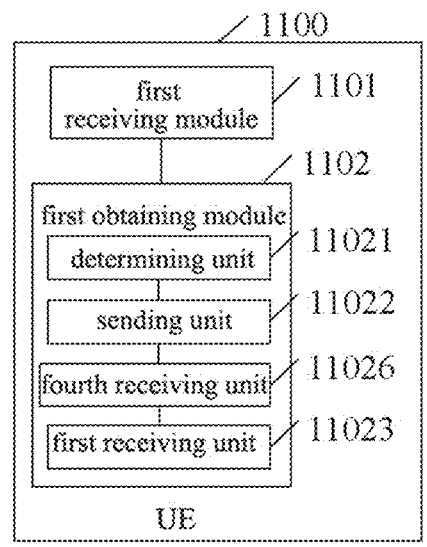
FIG. 14 is still yet another schematic view showing a UE according to some embodiments of the present disclosure.

Optionally, as shown in FIG. 14, the first obtaining module 1102 further includes: a fourth receiving unit 11026, configured to receive third scheduling information of the on-demand SI sent by the network side device, where the on-demand SI corresponding to the third scheduling information includes the on-demand SI required by the UE, and the third scheduling information includes a predefined parameter configuration; a first receiving unit 11023, configured to receive an on-demand SI response message sent by the network side device by using a parameter configuration included in the third scheduling information.

Figure 15:
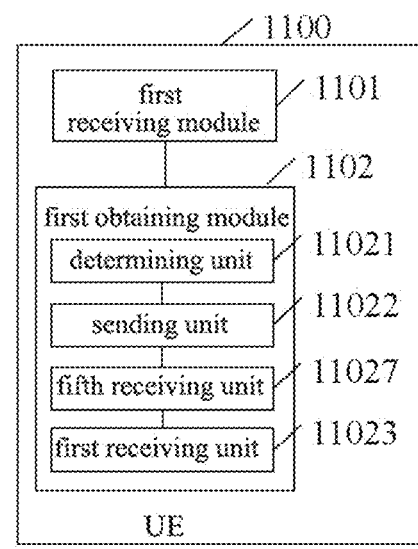
FIG. 15 is still yet another schematic view showing a UE according to some embodiments of the present disclosure.

Optionally, as shown in FIG. 15, the first obtaining module 1102 further includes: a fifth receiving unit 11027, configured to receive fourth scheduling information of the on-demand SI sent by the network side device, where the on-demand SI corresponding to the fourth scheduling information includes the on-demand SI required by the UE and the fourth scheduling information includes a second part parameter configuration; and a first receiving unit 11023, configured to: if the parameter configuration included in the first scheduling information includes a first part of parameter configuration, use the first part of parameter configuration and the second part of parameter configuration to receive the on-demand SI response message sent by the network side device.

Figure 16:
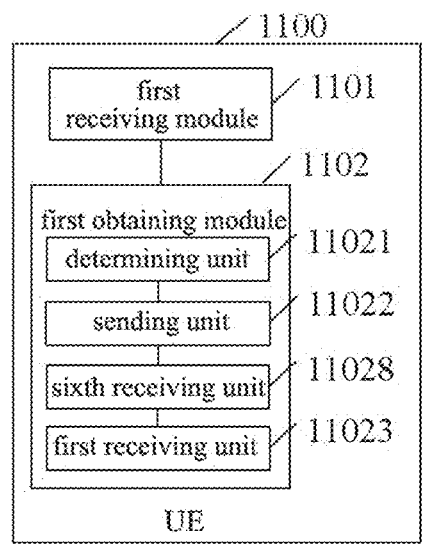
FIG. 16 is still yet another schematic view showing a UE according to some embodiments of the present disclosure.

Optionally, as shown in FIG. 16, the first obtaining module 1102 further includes: a sixth receiving unit 11028, configured to receive a transmission indication sent by the network side device, where the transmission indication is used to indicate that the SI response message is sent based on the first scheduling information; and a first receiving unit 11023, configured to receive an on-demand SI response message sent by the network side device by using a parameter configuration included in the first scheduling information.

Optionally, the sending unit is further configured to: if the UE determines that the on-demand SI modified by the network side device does not include all or part of the on-demand SI required by the UE based on the SI modification indication, resend the on-demand SI request message.

Optionally, the sending unit is further configured to, if the SI response message does not include all or part of the on-demand SI required by the UE, resend the on-demand SI request message; or the sending unit is further configured to: if the first receiving unit does not receive the SI response message within a predefined or pre-configured time period, resend the on-demand SI request message.

Figure 17:
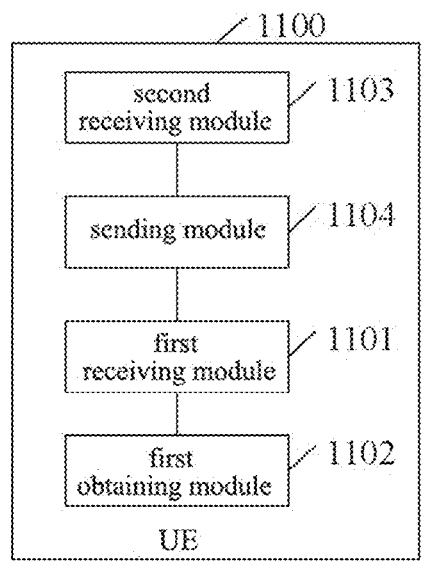
FIG. 17 is still yet another schematic view showing a UE according to some embodiments of the present disclosure.

Optionally, as shown in FIG. 17, the UE 1100 further includes: a second receiving module 1103, configured to receive indication information sent by the network side device, where the indication information is used to indicate that the network side device provides on-demand SI; a sending module 1104, configured to send an on-demand SI request message to the network side device based on the indication information, where the on-demand SI request message is used to request on-demand SI required by the UE; a first receiving module 1101, configured to receive first scheduling information of the on-demand SI required by the UE sent by the network side device; and a first obtaining module 1102, configured to receive an on-demand SI response message sent by the network side device by using a parameter configuration included in the first scheduling information.

Optionally, the indication information is used to indicate whether the network side device provides on-demand SI; or the indication information includes a SI list of the on-demand SI provided by the network side device.

The sending module 1104 is configured to: if the indication information indicates that the network side device provides the on-demand SI, send an on-demand SI request message to the network side device; or the sending module 1104 is configured to, if the on-demand SI indicated by the SI list includes the on-demand SI required by the UE, send the on-demand SI request message to the network side device.

Optionally, the sending unit 11022 is configured to send an on-demand SI request message to the network side device by using Msg3 of the random access procedure; or the sending unit 11022 is configured to send an on-demand SI request message to the network side device by using an RRC message; or the sending unit 11022 send the on-demand SI request message to the network side device through MAC CE.

Figure 18:
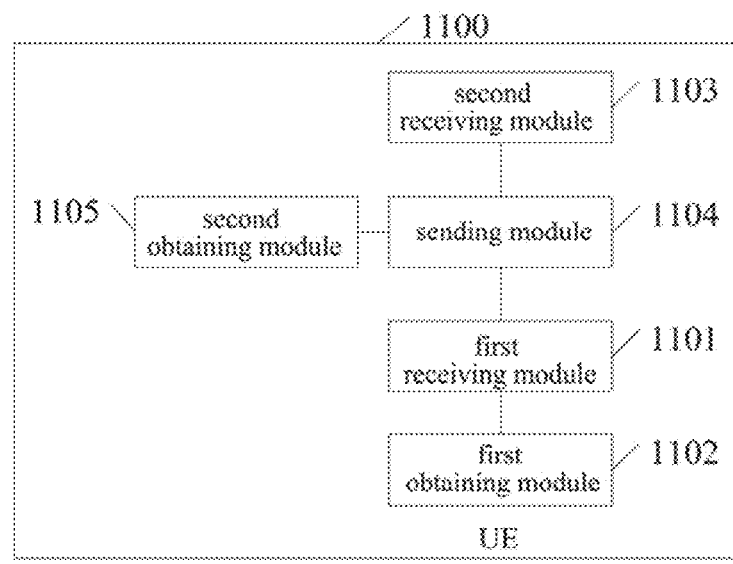
FIG. 18 is still yet another schematic view showing a UE according to some embodiments of the present disclosure.

Optionally, as shown in FIG. 18, UE 1100 further includes: a second obtaining module 1105, configured to obtain mapping relationship information between an uplink signal and the on-demand SI.

The sending unit 11022 is configured to send an uplink signal to the network side device, where there is a mapping relationship between the uplink signal and the on-demand SI required by the UE.

It should be noted that, in the embodiment, the above mentioned UE 500 may be the UE in any embodiment of the disclosure, the UE 500 may be implement any method in the embodiments of the disclosure, the same beneficial effects are achieved, and details are not described herein again.

Figure 19:
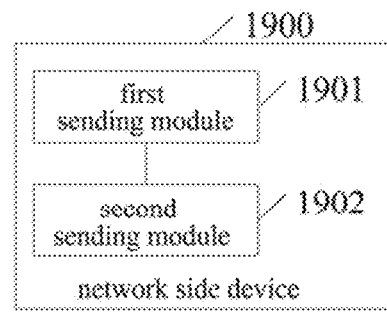
FIG. 19 is a schematic view showing a network side device according to some embodiments of the present disclosure.

Referring to FIG. 19, an embodiment of the present disclosure provides a network side device. As shown in FIG. 19, the network side device 1900 includes: a first sending module 1901, configured to send first scheduling information of an on-demand SI to a UE; a second sending module 1902, configured to send the on-demand SI to the UE.

Optionally, the first scheduling information includes one or more parameter configurations: a SI mapping table, a SI period, a SI time window, a starting point, and a transmission number of SI, wherein a SI mapping table is used to represent the on-demand SI corresponding to the first scheduling information.

Optionally, the first sending module 1901 is configured to periodically broadcast SI, where the SI periodically broadcasted includes the first scheduling information of the on-demand SI.

Figure 20:
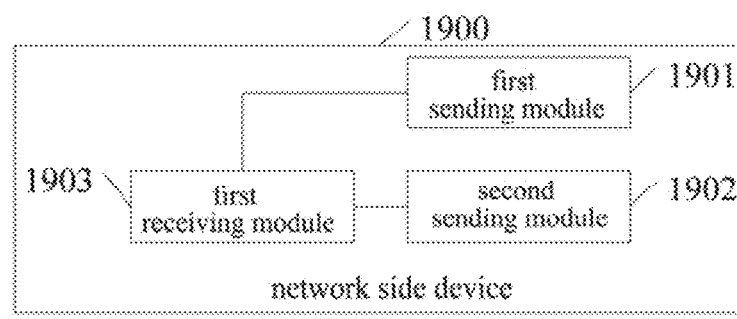
FIG. 20 is another schematic view showing a network side device according to some embodiments of the present disclosure.

Optionally, as shown in FIG. 20, the network side device 1900 further includes: a first receiving module 1903, configured to receive an on-demand SI request message sent by the UE, where the on-demand SI request message is used to request on-demand SI required by the UE; and a second sending module 1902, configured to send an on-demand SI response message to the UE.

Figure 21:
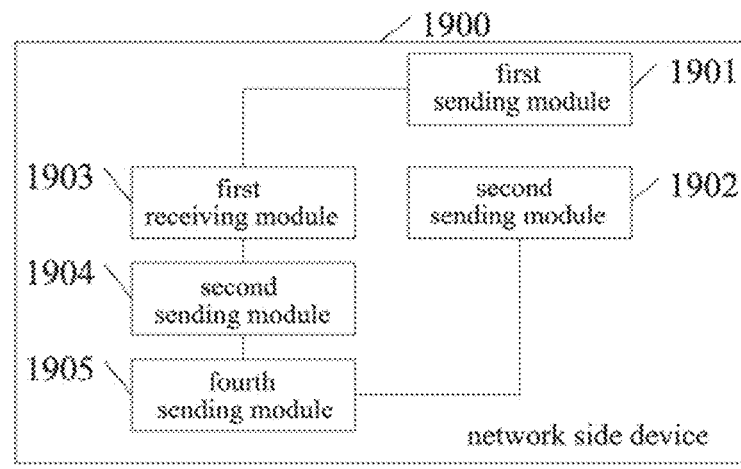
FIG. 21 is yet another schematic view showing a network side device according to some embodiments of the present disclosure.

Optionally, as shown in FIG. 21, the network side device 1900 further includes: a third sending module 1904, configured to send a SI modification indication to the UE; a fourth sending module 1905, configured to send second scheduling information of the required SI to the UE, where the on-demand SI corresponding to the second scheduling information includes an on-demand SI required by the UE and the second scheduling information includes a predefined parameter configuration; and a second sending module 1902, configured to send an on-demand SI response message to the UE based on the parameter configuration included in the second scheduling information.

Figure 22:
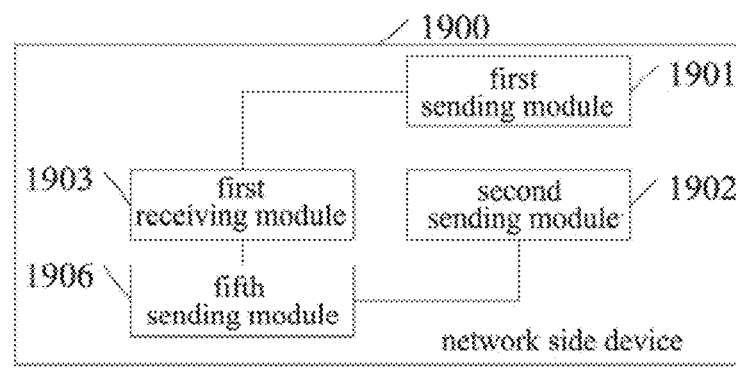
FIG. 22 is still yet another schematic view showing a network side device according to some embodiments of the present disclosure.

Optionally, as shown in FIG. 22, the network side device 1900 further includes: a fifth sending module 1906, configured to send third scheduling information of the on-demand SI to the UE, where the on-demand SI corresponding to the third scheduling information includes an on-demand SI required by the UE, and the third scheduling information includes a predefined parameter configuration; a second sending module 1902, configured to send an on-demand SI response message to the UE based on the parameter configuration included in the third scheduling information.

Figure 23:
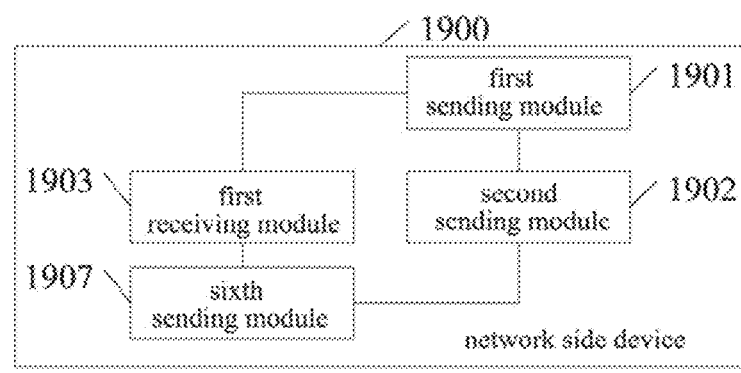
FIG. 23 is still yet another schematic view showing a network side device according to some embodiments of the present disclosure.

Optionally, as shown in FIG. 23, the network side device 1900 further includes: a sixth sending module 1907, configured to: if the parameter configuration included in the first scheduling information includes only the first part of parameter configuration, the network side device sends fourth scheduling information of the on-demand SI to the UE, where the on-demand SI corresponding to the fourth scheduling information includes on-demand SI required by the UE, and the fourth scheduling information includes a second part of parameter configuration.

The second sending module 1902 is configured to send an on-demand SI response message to the UE based on the first part of parameter configuration and the second part of parameter configuration.

Figure 24:
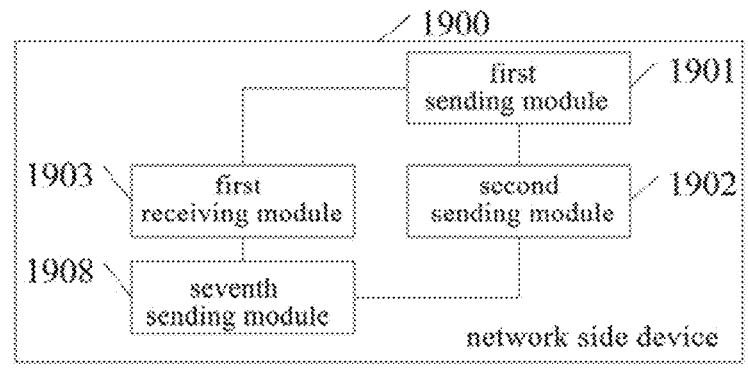
FIG. 24 is still yet another schematic view showing a network side device according to some embodiments of the present disclosure.

Optionally, as shown in FIG. 24, the network side device 1900 further includes: a seventh sending module 1908, configured to send a transmission indication to the UE, where the transmission indication is used to indicate that the SI response message is sent based on the first scheduling information.

The second sending module 1902 is configured to send an on-demand SI response message to the UE based on the parameter configuration included in the first scheduling information.

Figure 25:
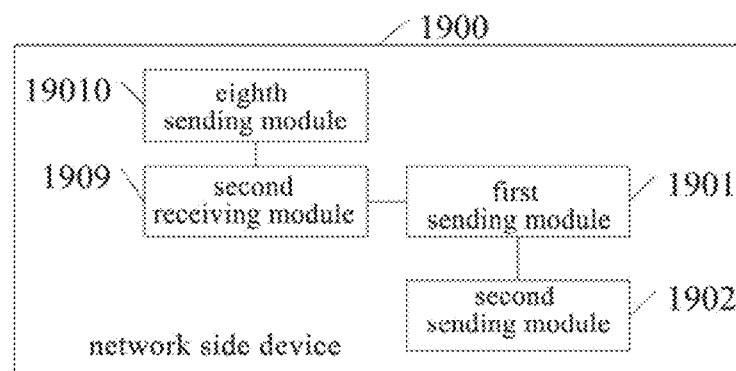
FIG. 25 is still yet another schematic view showing a network side device according to some embodiments of the present disclosure.

Optionally, as shown in FIG. 25, the network side device 1900 further includes: an eighth sending module 1909, configured to send indication information to the UE, where the indication information is used to indicate that the network side device provides on-demand SI; an eighth receiving module 19010, configured to receive an on-demand SI request message sent by the UE based on the indication information, where the on-demand SI request message is used to request the on-demand SI required by the UE.

The first sending module 1901 is configured to send first scheduling information of the on-demand SI required by the UE to UE.

The second sending module 1902 is configured to send an on-demand SI response message to the UE based on the parameter configuration included in the first scheduling information.

Optionally, the indication information is used to indicate whether the network side device provides the on-demand SI; or the indication information includes a SI list of the on-demand SI provided by the network side device.

Optionally, the first receiving module 1903 is configured to receive the on-demand SI request message sent by the UE by using the Msg3 of the random access procedure; or the first receiving module 1903 is configured to receive the on-demand SI request message sent by the UE by using an RRC message; or the first receiving module 1903 is configured to receive the on-demand SI request message sent by the UE by using a MAC CE.

Figure 26:
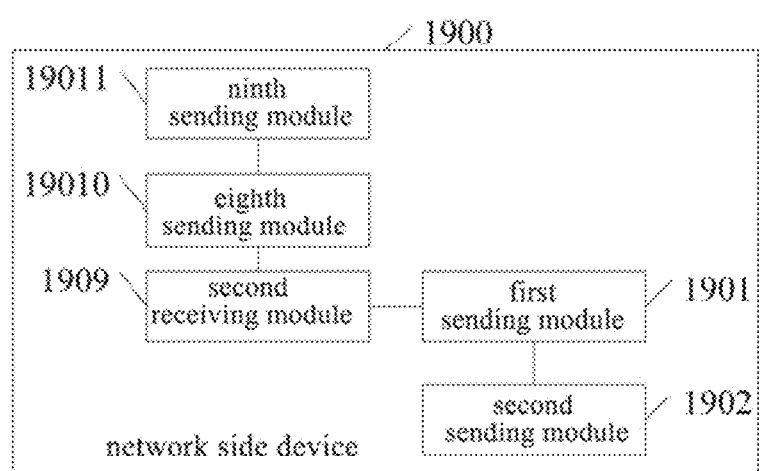
FIG. 26 is still yet another schematic view showing a network side device according to some embodiments of the present disclosure.

Optionally, as shown in FIG. 26, the network side device 1900 further includes: a ninth sending module 19011, configured to send mapping relationship information between the uplink signal and the on-demand SI to the UE.

The first receiving module 1903 is configured to receive an uplink signal sent by the UE, where there is a mapping relationship between the uplink signal and the on-demand SI required by the UE.

It should be noted that, in the embodiment, the network side device 800 may be the network side device in any method embodiments of the disclosure, any implementation of the network side device in the method of the disclosure can be implemented by the above network side device 800 in this embodiment, the same beneficial effect is achieved, and details are not described herein again.

Figure 27:
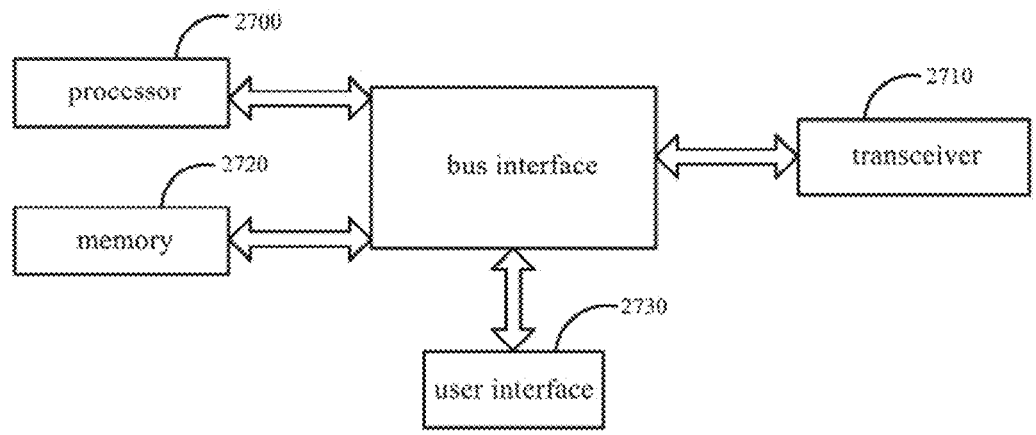
FIG. 27 is still yet another schematic view showing a UE according to some embodiments of the present disclosure.

Referring to FIG. 27, an embodiment of the present disclosure provides another structure of a UE, where the UE includes: a processor 2700, a transceiver 2710, a memory 2720, a user interface 2730, and a bus interface.

The processor 2700 is configured to read programs in the memory 2720 and perform the following process: receiving, by the transceiver 2710, first scheduling information of on-demand SI information sent by the network side device; obtaining the on-demand SI sent by the network side device by the transceiver 2710 based on the first scheduling information.

The transceiver 2710 is configured to receive and transmit data under the control of the processor 2700.

In FIG. 27, the bus architecture may include any number of interconnected buses and bridges, used to connect one or more processors represented by processor 2700 and various circuits of memory represented by memory 2720. The bus architecture can also link various other circuits such as peripherals, voltage regulators, and power management circuits, which are well known in the art and, therefore, will not be further described herein. The bus interface provides an interface. The transceiver 2710 can be a plurality of components, including a transmitter and a receiver, providing units for communicating with various other devices on a transmission medium. For different UEs, the user interface 2730 may also be an interface capable of externally or internally connecting the required devices, including but not limited to a keypad, a display, a speaker, a microphone, a joystick, and the like.

The processor 2700 is responsible for managing the bus architecture and general processing, and the memory 2720 can store data used by the processor 2700 when performing operations.

Optionally, the first scheduling information includes one or more parameter configurations: a SI mapping table, a SI period, a SI time window, a starting point, and a transmission number of SI, wherein the SI mapping table is used to represent the on-demand SI corresponding to the first scheduling information.

Optionally, the receiving the first scheduling information of the on-demand SI of the network side device, includes: receiving SI periodically broadcasted by the network side device, where the SI periodically broadcasted includes first scheduling information of the on-demand SI.

Optionally, the obtaining the on-demand SI sent by the network side device based on the first scheduling information includes: receiving, if the first scheduling information includes a predefined parameter configuration, the on-demand SI sent by the network side device by the transceiver 2710 using the parameter configuration included in the first scheduling information; or receiving, if the first scheduling information includes a predefined parameter configuration and the on-demand SI corresponding to the first scheduling information includes the on-demand SI required by the UE, the on-demand SI sent by the network side device by the transceiver 2710 using the parameter information included in the first scheduling information.

Optionally, the obtaining the on-demand SI sent by the network side device based on the first scheduling information includes: determining whether an on-demand SI request message needs to be sent to the network side device based on the first scheduling information; sending, if it is determined that the on-demand SI request message needs to be sent to the network side device, the on-demand SI request message to the network side device by using the transceiver 2710, where the on-demand SI request message is used to request the on-demand SI required by the UE; receiving the on-demand SI response message sent by the network side device by the transceiver 2710.

Optionally, the determining whether to send an on-demand SI request message to the network side device based on the first scheduling information, includes: determining whether the on-demand SI corresponding to the first scheduling information includes on-demand SI required by the UE, and if not, determining that an on-demand SI request message needs to be sent to the network side device; or determining whether the parameter configuration included in the first scheduling information includes only the first part of parameter configuration, and if yes, determining that the on-demand SI request message needs to be sent to the network side device.

Optionally, the obtaining the on-demand SI sent by the network side device based on the first scheduling information, further includes: receiving, by the transceiver 2710, a SI modification indication sent by the network side device; receiving, by the transceiver 2710, the second scheduling information of the on-demand SI sent by the network side device based on the SI modification indication, where the on-demand SI corresponding to the second scheduling information includes the on-demand SI required by UE, and the second scheduling information includes a predefined parameter configuration.

The receiving the on-demand SI response message sent by the network side device, includes: receiving an on-demand SI response message sent by the network side device by using the parameter configuration included in the second scheduling information.

Optionally, the obtaining the on-demand SI sent by the network side device based on the first scheduling information, further includes: receiving, by the transceiver 2710, third scheduling information of the on-demand SI sent by the network side device, where the on-demand SI corresponding to the third scheduling information includes on-demand SI required by the UE and the third scheduling information includes a predefined parameter.

The receiving the on-demand SI response message sent by the network side device, includes: receiving an on-demand SI response message sent by the network side device by using the parameter configuration included in the third scheduling information.

Optionally, the obtaining the on-demand SI sent by the network side device based on the first scheduling information, further includes: receiving, by the transceiver 2710, fourth scheduling information of the on-demand SI sent by the network side device, where the on-demand SI corresponding to the fourth scheduling information includes on-demand SI required by the UE and the fourth scheduling information includes a second partial parameter configuration.

The receiving the on-demand SI response message sent by the network side device, includes: receiving, if the parameter configuration included in the first scheduling information includes a first part of parameter configuration, an on-demand SI response message sent by the network side device by using the first part of parameter configuration and the second part of parameter configuration.

Optionally, the obtaining the on-demand SI sent by the network side device based on the first scheduling information, further includes: receiving, by the transceiver 2710, a transmission indication sent by the network side device, where the transmission indication is used to indicate that the SI response message is sent based on the first scheduling information.

The receiving the on-demand SI response message sent by the network side device, includes: receiving an on-demand SI response message sent by the network side device by using the parameter configuration included in the first scheduling information.

Optionally, the processor 2700 is further configured to: If the UE determines that all or part of the on-demand SI required by the UE is not included in the on-demand SI modified by the network side device based on the SI modification indication, retransmit, by the transceiver 2710, the on-demand SI request message.

Optionally, the processor 2700 is further configured to: if the SI response message does not include all or part of the on-demand SI required by the UE, retransmit, by the transceiver 2710, the on-demand SI request message; or if the UE does not receive the SI response message within a predefined or pre-configured time period, resend, by the transceiver 2710, the on-demand SI request message.

Optionally, the processor 2700 is further configured to: receive, by the transceiver 2710, the indication information sent by the network side device, where the indication information is used to indicate that the network side device provides on-demand SI; send, by the transceiver 2710, an on-demand SI request message to the network side device based on the indication information, where the on-demand SI request message is used to request on-demand SI required by the UE The receiving, by the network side device, the first scheduling information of the on-demand SI, includes: receiving, by the network side device, first scheduling information of the on-demand SI required by the UE.

The obtaining the on-demand SI sent by the network side device based on the first scheduling information, includes: receiving an on-demand SI response message sent by the network side device by using the parameter configuration included in the first scheduling information.

Optionally, the indication information is used to indicate whether the network side device provides the on-demand SI; or the indication information includes a SI list of the on-demand SI provided by the network side device The the sending, by the network side device, the on-demand SI request message based on the indication information, includes: sending an on-demand SI request message to the network side device if the indication information indicates that the network side device provides on-demand SI; or sending an on-demand SI request message to the network side device if the on-demand SI indicated by the SI list includes the on-demand SI required by the UE.

Optionally, the sending, by the network side device, an on-demand SI request message, includes: sending an on-demand SI request message to the network side device through Msg3 of the random access procedure; or sending, by the UE, an on-demand SI request message to the network side device by using an RRC message; or sending, by the UE, an on-demand SI request message to the network side device by using a MAC CE.

Optionally, the processor 2700 is further configured to: obtain mapping relationship information between the uplink signal and the on-demand SI.

The sending the on-demand SI request message to the network side device, includes: sending an uplink signal to the network side device, where there is a mapping relationship between the uplink signal and the on-demand SI required by the UE.

It should be noted that, in the embodiment, the UE may be the UE in any method embodiments of the disclosure, any implementation of the UE in the method of the disclosure can be implemented by the above UE in this embodiment, the same beneficial effect is achieved, and details are not described herein again.

Figure 28:
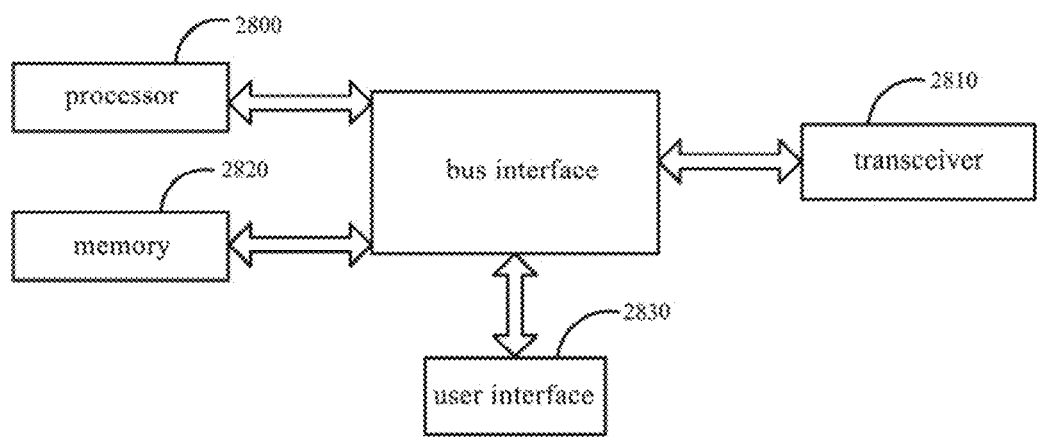
FIG. 28 is still yet another schematic view showing a network side device according to some embodiments of the present disclosure.

Referring to FIG. 28, a structure of a network side device is shown, wherein the network side device includes: a processor 2800, a transceiver 2810, a memory 2820, a user interface 2280, and a bus interface.

The processor 2800 is configured to read a program in the memory 2820 and perform the following process: sending, by the network device, first scheduling information of the on-demand SI to the UE via the transceiver 2810; sending the on-demand SI to the UE via transceiver 2810.

The transceiver 2810 is configured to receive and transmit data under the control of the processor 2800.

In FIG. 28, the bus architecture may include any number of interconnected buses and bridges, used to connect one or more processors represented by processor 2800 and various circuits of memory represented by memory 2820. The bus architecture can also link various other circuits such as peripherals, voltage regulators, and power management circuits, which are well known in the art and, therefore, will not be further described herein. The bus interface provides an interface. The transceiver 2810 can be a plurality of components, including a transmitter and a receiver, providing units for communicating with various other devices on a transmission medium. For different UEs, the user interface 2280 may also be an interface capable of externally or internally connecting the required devices, including but not limited to a keypad, a display, a speaker, a microphone, a joystick, and the like.

The processor 2800 is responsible for managing the bus architecture and general processing, and the memory 2820 can store data used by the processor 2800 when performing operations.

Optionally, the first scheduling information includes one or more parameter configurations: a SI mapping table, a SI period, a SI time window, a starting point, and a transmission number of SI, wherein the SI mapping table is used to represent the on-demand SI corresponding to the first scheduling information.

Optionally, the sending first scheduling information of the on-demand SI to UE, includes: periodically broadcasting SI, the SI periodically broadcasted includes first scheduling information of the on-demand SI.

Optionally, the processor 2800 is further configured to: receiving, by the transceiver 2810, an on-demand SI request message sent by the UE, where the on-demand SI request message is used to request on-demand SI required by the UE.

The sending the on-demand SI to the UE, includes: sending an on-demand SI response message to the UE.

Optionally, the processor 2800 is further configured to: send, by the transceiver 2810, a SI modification indication to the UE; send, by the transceiver 2810, the second scheduling information of the on-demand SI to the UE, where the on-demand SI corresponding to the second scheduling information includes on-demand SI required by the UE, and the second scheduling information includes a predefined parameter configuration.

The sending the on-demand SI response message to the UE, includes: sending an on-demand SI response message to the UE based on the parameter configuration included in the second scheduling information.

Optionally, the processor 2800 is further configured to: send the third scheduling information of the SI to the UE, where the on-demand SI corresponding to the third scheduling information includes on-demand SI required by the UE, and the third scheduling information includes a predefined parameter configuration.

The sending the on-demand SI response message to the UE, includes: sending an on-demand SI response message to the UE based on the parameter configuration included in the third scheduling information.

Optionally, the processor 2800 is further configured to: send, if the parameter configuration included in the first scheduling information includes only the first part of parameter configuration, the fourth scheduling information of the on demand SI to the UE via the transceiver 2810, where the on-demand SI corresponding to the fourth scheduling information includes the on-demand SI required by the UE, and the fourth scheduling information includes a second part of parameter configuration.

The sending the on-demand SI response message to the UE, includes: sending an on-demand SI response message to the UE based on the first part of parameter configuration and the second part of parameter configuration.

Optionally, the processor 2800 is further configured to: send, by the transceiver 2810, a transmission indication to the UE, where the transmission indication is used to indicate that the SI response message is sent based on the first scheduling information.

The sending the on-demand SI response message to the UE, includes: sending an on-demand SI response message to the UE based on the parameter configuration included in the first scheduling information.

Optionally, the processor 2800 is further configured to: send, by the transceiver 2810, the indication information to the UE, where the indication information is used to indicate that the network side device provides on-demand SI; receive, by the transceiver 2810, an on-demand SI request message sent by the UE based on the indication information, where the on-demand SI request message is used to request on-demand SI required by the UE.

The sending, by the UE, first scheduling information of the on-demand SI, includes: sending the first scheduling information of the on-demand SI required by the UE to UE.

The sending the on-demand SI to the UE, includes: sending an on-demand SI response message to the UE based on the parameter configuration included in the first scheduling information.

Optionally, the indication information is used to indicate whether the network side device provides the on-demand SI; or the indication information includes a SI list of the on-demand SI provided by the network side device.

Optionally, the receiving the on-demand SI request message sent by the UE includes: receiving the on-demand SI request message sent by the UE through the Msg3 of the random access procedure; or receiving the on-demand SI request message sent by the UE by using an RRC message; or receiving the on-demand SI request message sent by the UE by using a MAC CE.

Optionally, the processor 2800 is further configured to: send a mapping relationship information between the uplink signal and the on-demand SI to UE.

The receiving the on-demand SI request message sent by the UE, includes: receiving an uplink signal sent by the UE, where there is a mapping relationship between the uplink signal and the on-demand SI required by the UE.

It should be noted that, in the embodiment, the network side device may be the network side device in any method embodiments of the disclosure, any implementation of the network side device in the method of the disclosure can be implemented by the above network side device in this embodiment, the same beneficial effect is achieved, and details are not described herein again.

In some embodiments of the present disclosure, it should be understood that the disclosed method and device may be implemented in other manners. For example, the device embodiments described above are merely illustrative. For example, the division of units is only a logical function division. In actual implementation, there may be other division manners, for example, multiple units or components may be combined or integrated into another system, or some features can be omitted or not executed. In addition, the coupling or communication connection shown or discussed herein may be a direct or indirect coupling or communication connection through some interface, device or unit, in electrical, mechanical or any other way.

In addition, each functional unit in various embodiments of the present disclosure may be integrated into one processing unit, or each unit may be physically included, or two or more units may be integrated into one unit. The above integrated unit can be implemented in the form of hardware or in the form of hardware and software.

The above-described integrated unit implemented in software can be stored in a computer readable storage medium. The above software functional unit is stored in a storage medium and includes a plurality of instructions for causing one computer device (which may be a personal computer, a server, or a network device, etc.) to perform a part of steps of the transmitting and receiving method. The storage medium includes: a U disk, a mobile hard disk, a read-only memory (ROM), a random access memory (RAM), a magnetic disk, or an optical disk, and the like.

The above are merely some embodiments of the present disclosure. Obviously, a person skilled in the art may make further modifications and improvements without departing from the spirit of the present disclosure, and these modifications and improvements shall also fall within the scope of the present disclosure.

What is claimed is:

1. A system information (SI) obtaining method, comprising:
   receiving, by a user equipment (UE), first scheduling information of on-demand SI sent by a network side device;
   obtaining, by the UE, the on-demand SI sent by the network side device based on the first scheduling information;
   wherein the obtaining, by the UE, the on-demand SI sent by the network side device based on the first scheduling information comprises:
   determining, by the UE, whether an on-demand SI request message is necessary to be sent to the network side device based on the first scheduling information;
   if yes, sending, by the UE, the on-demand SI request message to the network side device, the on-demand SI request message being used to request the on-demand SI required by the UE; and
   receiving, by the UE, an on-demand SI response message sent by the network side device;
      wherein the obtaining, by the UE, the on-demand SI sent by the network side device based on the first scheduling information further comprises: receiving, by the UE, a SI modification indication sent by the network side device; receiving, by the UE, a second scheduling information of the on-demand SI sent by the network side device based on the SI modification indication, wherein the on-demand SI corresponding to the second scheduling information includes the on-demand SI required by the UE, and the second scheduling information comprises predefined parameter configuration;
      the receiving, by the UE, the on-demand SI response message sent by the network side device comprises: receiving, by the UE, the on-demand SI response message sent by the network side device by using parameter configuration included in the second scheduling information;
      or,
      wherein the obtaining, by the UE, the on-demand SI sent by the network side device based on the first scheduling information further comprises: receiving, by the UE, a transmission indication sent by the network side device, the transmission indication being used to indicate that the SI response message is sent based on the first scheduling information;
      the receiving, by the UE, the on-demand SI response message sent by the network side device, comprises: receiving, by the UE, the on-demand SI response message sent by the network side device by using parameter configuration comprised in the first scheduling information.

2. The method according to claim 1, wherein the first scheduling information comprises one or more parameter configurations: a SI mapping table, a SI period, a SI time window, a starting point, and a transmission number of the SI,
   wherein the SI mapping table is used to indicate the on-demand SI corresponding to the first scheduling information.

3. The method according to claim 1, wherein the receiving, by the UE, the first scheduling information of the on-demand SI from the network side device comprises:
   receiving, by the UE, SI periodically broadcasted by the network side device, and the SI periodically broadcasted by the network side device comprising the first scheduling information of the on-demand SI.

4. The method according to claim 1, wherein the obtaining, by the UE, the on-demand SI sent by the network side device based on the first scheduling information comprises:
   if the first scheduling information includes a predefined parameter configuration, using, by the UE, the parameter configuration included in the first scheduling information to receive the on-demand SI sent by the network side device; or
   if the first scheduling information includes a predefined parameter configuration and the on-demand SI corresponding to the first scheduling information includes the on-demand SI required by the UE, using, by the UE, the parameter configuration included in the first scheduling information to receive the on-demand SI sent by the network side device.

5. The method according to claim 1, wherein the determining, by the UE, whether an on-demand SI request message is necessary to be sent to the network side device based on the first scheduling information, comprises:
   determining, by the UE, whether the on-demand SI corresponding to the first scheduling information includes the on-demand SI required by the UE, and if not, determining that on-demand SI request message is necessary to be sent to the network side device; or
   determining, by the UE, whether parameter configuration included in the first scheduling information includes only a first part of parameter configuration, and if yes, determining that the on-demand SI request message is necessary to be sent to the network side device.

6. The method according to claim 5, wherein the obtaining, by the UE, the on-demand SI sent by the network side device based on the first scheduling information further comprises: receiving, by the UE, fourth scheduling information of the on-demand SI sent by the network side device, wherein the on-demand SI corresponding to the fourth scheduling information includes on-demand SI required by the UE and the fourth scheduling information includes a second part of parameter configuration;
   the receiving, by the UE, the on-demand SI response message sent by the network side device, comprises: if the parameter configuration included in the first scheduling information includes the first part of parameter configuration, receiving, by the UE, the on-demand SI response message sent by the network side device by using the first part of parameter configuration and the second part of parameter configuration.

7. The method according to claim 1, further comprising:
if the UE determines that the on-demand SI modified by the network side device does not include all or part of the on-demand SI required by the UE based on the SI modification indication, resending, by the UE, the on-demand SI request message.

8. The method according to claim 1, further comprising:
if the SI response message does not include all or part of the on-demand SI required by the UE, resending, by the UE, the on-demand SI request message; or
if the UE does not receive the on-demand SI response message within a predefined or pre-configured time period, resending, by the UE, the on-demand SI request message.

9. The method according to claim 1, further comprising:
receiving, by the UE, indication information sent by the network side device, wherein the indication information is used to indicate whether the network side device provides the on-demand SI;
sending, by the UE, an on-demand SI request message to the network side device based on the indication information, wherein the on-demand SI request message is used to request the on-demand SI required by the user equipment;
the receiving, by the UE, the first scheduling information of the on-demand SI sent by the network side device, comprises:
receiving, by the UE, the first scheduling information of the on-demand SI required by UE and sent by the network side device;
the obtaining, by the UE, the on-demand SI sent by the network side device based on the first scheduling information, comprises:
receiving, by the UE, an on-demand SI response message sent by the network side device by using parameter configuration included in the first scheduling information.

10. The method according to claim 9, wherein the indication information is used to indicate whether the network side device provides the on-demand SI, or the indication information includes a SI list of the on-demand SI provided by the network side device;
the sending, by the UE, the on-demand SI request message to the network side device based on the indication information comprises:
if the indication information indicates that the network side device provides the on-demand SI, sending, by the UE, the on-demand SI request message to the network side device; or
if the on-demand SI indicated by the SI list includes the on-demand SI required by the UE, sending, by the UE, the on-demand SI request message to the network side device.

11. The method according to claim 1, wherein the sending, by the UE, the on-demand SI request message to the network side device, comprises:
sending, by the UE, the on-demand SI request message to the network side device by using a message Msg3 of a random access procedure; or
sending, by the UE, the on-demand SI request message to the network side device by using an RRC message; or
sending, by the UE, the on-demand SI request message to the network side device by using a MAC control unit CE.

12. The method according to claim 1, further comprising:
obtaining, by the UE, mapping relationship information between an uplink signal and the on-demand SI;
the sending, by the UE, the on-demand SI request message to the network side device, includes: sending, by the UE, the uplink signal to the network side device, wherein there is a mapping relationship between the uplink signal and the on-demand SI required by the UE.

13. A system information (SI) obtaining method, comprising:
sending, by a network side device, first scheduling information of an on-demand SI to a user equipment (UE); and
sending, by the network side device, the on-demand SI to the UE;
receiving, by the network side device, an on-demand SI request message sent by the UE, wherein the on-demand SI request message is used to request the on-demand SI required by the UE;
the sending, by the network side device, the on-demand SI to the UE, comprises: sending, by the network side device, an on-demand SI response message to the UE;
sending, by the network side device, a modification indication of the SI to the UE; sending, by the network side device, to the UE, second scheduling information of the on-demand SI, wherein the on-demand SI corresponding to the second scheduling information includes the on-demand SI required by the UE, and the second scheduling information includes a predefined parameter configuration;
the sending, by the network side device, the on-demand SI response message to the UE, comprises: sending, by the network side device, an on-demand SI response message to the UE based on the parameter configuration included in the second scheduling information;
or,
sending, by the network side device, a transmission indication to the UE, wherein the transmission indication is used to indicate that the SI response message is sent based on the first scheduling information;
the sending, by the network side device, the on-demand SI response message to the UE, comprises: sending, by the network side device, the on-demand SI response message to the UE based on parameter configuration included in the first scheduling information.

14. The method according to claim 13, wherein the first scheduling information comprises one or more parameter configurations: a SI mapping table, a SI period, a SI time window, a starting point, and a transmission number of SI, wherein the SI mapping table is used to indicate the on-demand SI corresponding to the first scheduling information.

15. A network side device, comprising a transceiver, a processor and a memory for storing programs and data used and executed by the processor, wherein
the processor is configured to implemented the SI obtaining method according to claim 13.

16. A user equipment, comprising a transceiver, a processor and a memory for storing programs and data used and executed by the processor, wherein
the transceiver is configured to receive first scheduling information of on-demand SI sent by a network side device,
the processor is configured to obtain, by the transceiver, the on-demand SI sent by the network side device based on the first scheduling information;

the processor is configured to determine whether an on-demand SI request message is necessary to be sent to the network side device based on the first scheduling information;

if yes, the transceiver is configured to send the on-demand SI request message to the network side device, the on-demand SI request message is used to request the on-demand SI required by the UE; and the transceiver is configured to receive an on-demand SI response message sent by the network side device;

the transceiver is configured to receive a SI modification indication sent by the network side device; the transceiver is configured to receive a second scheduling information of the on-demand SI sent by the network side device based on the SI modification indication, wherein the on-demand SI corresponding to the second scheduling information includes the on-demand SI required by the UE, and the second scheduling information comprises predefined parameter configuration;

the transceiver is configured to receive the on-demand SI response message sent by the network side device by using parameter configuration included in the second scheduling information;

or, the transceiver is configured to receive a transmission indication sent by the network side device, the transmission indication being used to indicate that the SI response message is sent based on the first scheduling information;

the transceiver is configured to receive the on-demand SI response message sent by the network side device by using parameter configuration comprised in the first scheduling information.

* * * * *